(12) United States Patent
Burch

(10) Patent No.: US 7,740,322 B2
(45) Date of Patent: Jun. 22, 2010

(54) SCHOOL BUS SEAT WITH ENERGY ABSORBER

(76) Inventor: Selwyn Arthur Burch, 30627 Webster Rd., Bay Village, OH (US) 44140

( * ) Notice: Subject to any disclaimer, the term of this patent is extended or adjusted under 35 U.S.C. 154(b) by 1296 days.

(21) Appl. No.: 11/104,948

(22) Filed: Apr. 13, 2005

(65) Prior Publication Data

US 2006/0076819 A1    Apr. 13, 2006

Related U.S. Application Data

(63) Continuation-in-part of application No. 10/954,782, filed on Sep. 30, 2004, now Pat. No. 7,338,119.

(51) Int. Cl.
A47C 7/02       (2006.01)
A47C 1/01       (2006.01)
(52) U.S. Cl. .................... 297/452.57; 297/445.1
(58) Field of Classification Search ............ 297/248, 297/451.1, 440.23, 452.18, 450.1, 449.1, 297/445.1, DIG. 1, DIG. 2, 452.35, 452.19, 297/452.57, 452.61, 452.31, 452.37; 248/188.8
See application file for complete search history.

(56) References Cited

U.S. PATENT DOCUMENTS

| 3,083,056 | A | * | 3/1963 | Ward ................... 297/452.19 |
| 3,501,197 | A | * | 3/1970 | Burton ................ 297/232 |
| 4,383,712 | A |   | 5/1983 | Kaganas |
| 4,688,662 | A |   | 8/1987 | Correll |
| 5,114,209 | A |   | 5/1992 | Dunn |
| D369,055 | S |   | 4/1996 | Bode |
| 5,609,395 | A |   | 3/1997 | Burch |
| 5,645,316 | A | * | 7/1997 | Aufrere et al. ......... 297/216.13 |
| D387,604 | S |   | 12/1997 | Melone |
| D403,195 | S |   | 12/1998 | Irwin-Tesmer |
| 6,056,353 | A | * | 5/2000 | Meara .................... 297/41 |
| D440,107 | S |   | 4/2001 | Hsu |
| 6,250,718 | B1 |   | 6/2001 | Newhouse et al. |
| 6,412,872 | B2 |   | 7/2002 | Takeda et al. |
| 6,415,494 | B1 |   | 7/2002 | Burch |
| 6,450,518 | B1 | * | 9/2002 | Howard .................. 280/246 |
| D491,405 | S |   | 6/2004 | Jones |
| D536,566 | S |   | 2/2007 | Burch |
| 7,338,119 | B2 |   | 3/2008 | Burch |
| 2002/0135217 | A1 |   | 9/2002 | Liu |
| 2002/0136591 | A1 | * | 9/2002 | Callahan ................. 403/188 |
| 2003/0141752 | A1 |   | 7/2003 | Igarashi |
| 2005/0140190 | A1 |   | 6/2005 | Kawashima |
| 2008/0143157 | A1 |   | 6/2008 | Burch |

OTHER PUBLICATIONS

Barry Metzler, Hennecke's Nafpurtec and Compurtec Equipment Technolofy for Lightweight Automotive Moldings, Hennecke Machiner Group, Bayer Materialscience LLC, 100 Bayer Road.

(Continued)

*Primary Examiner*—Milton Nelson, Jr.
(74) *Attorney, Agent, or Firm*—Woodling, Krost and Rust

(57) ABSTRACT

A school bus seat comprises a pin having a cross-sectional shape selected from the group consisting of a pentagon, a hexagon, a heptagon and an octagon. First and second brackets include an aperture selected correspondingly from the group consisting of a pentagon, a hexagon, a heptagon and an octagon. First and second supports include an aperture selected correspondingly from the group consisting of a pentagon, a hexagon, a heptagon and an octagon. The apertures in the brackets and supports are formed in a fiber reinforced polymer such that the apertures are devoid of knit lines. The pins reside in the apertures of the supports and brackets inhibiting rotation of the brackets with respect to the supports. A seat back is secured to the brackets.

20 Claims, 25 Drawing Sheets

OTHER PUBLICATIONS

Ignacio G. Osio, Phd and Gregory J. Lindner, Bayer Materialscience, 100 Bayer Road, Pittsburgh, PA 15205, Attachment Strategies for Baypreg F-Sandwich Composites.

Ronald A. Cageao, Klaus Franken and James M. Lorenzo. Studies of Composites Made With Baypreg F Component Selection for Optimal Mechanical Properties, Bayer Material Science.

* cited by examiner

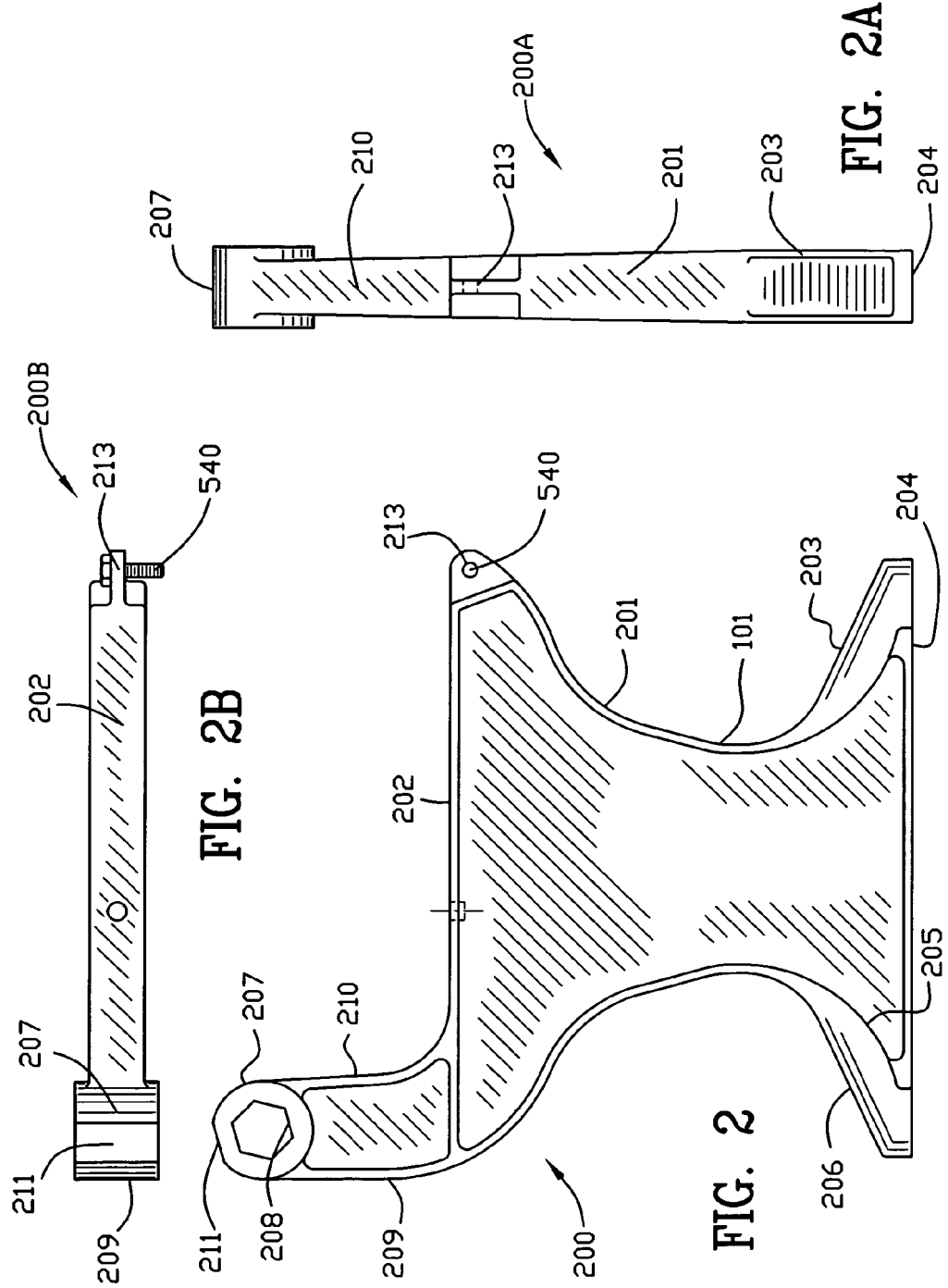

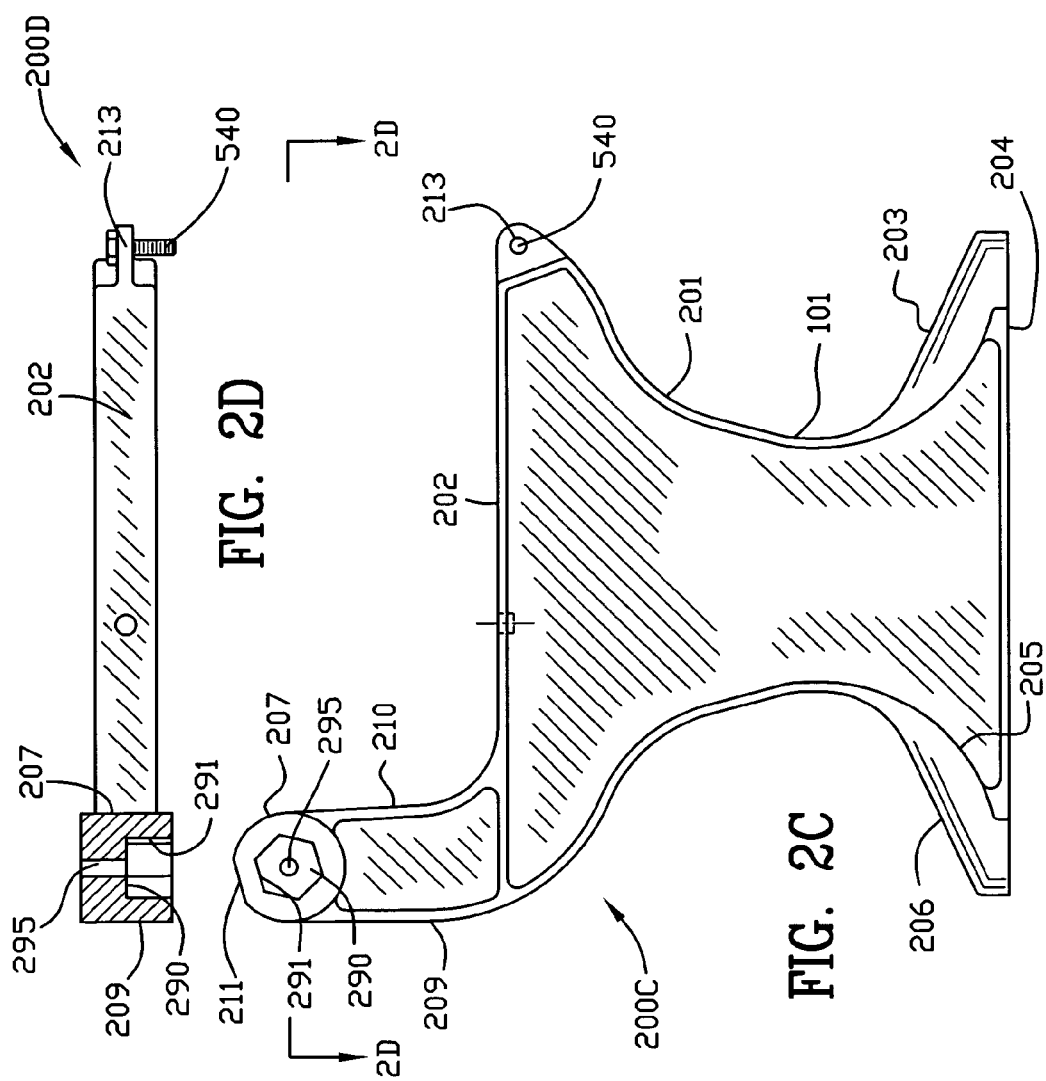

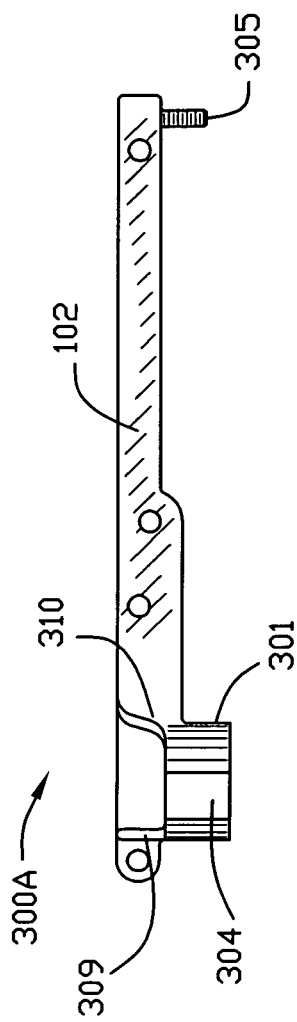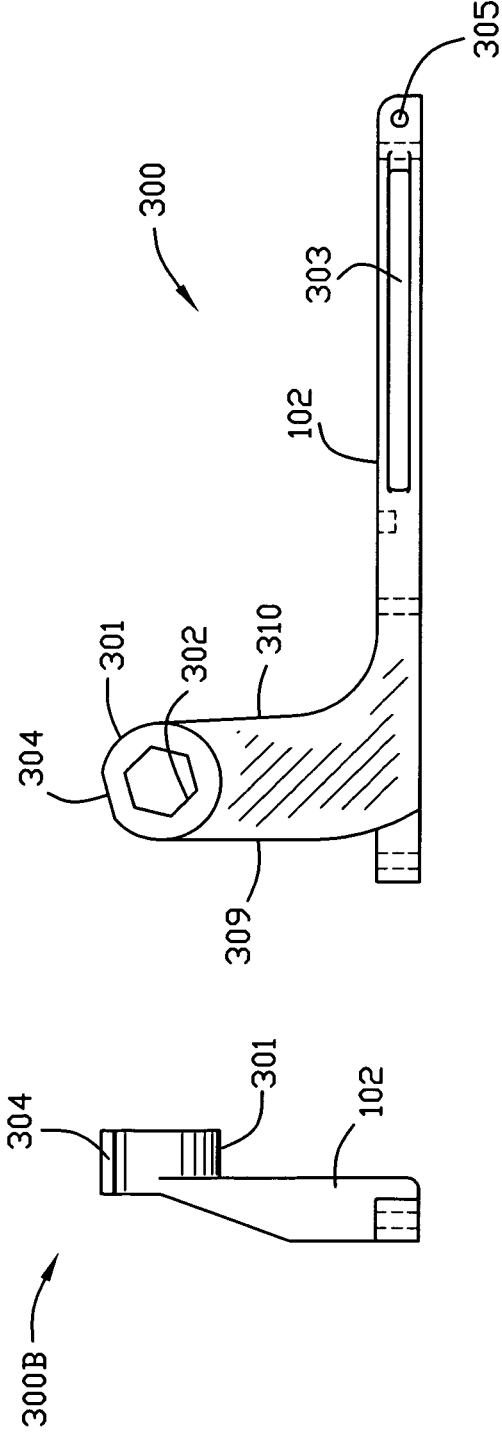
FIG. 3A
FIG. 3
FIG. 3B

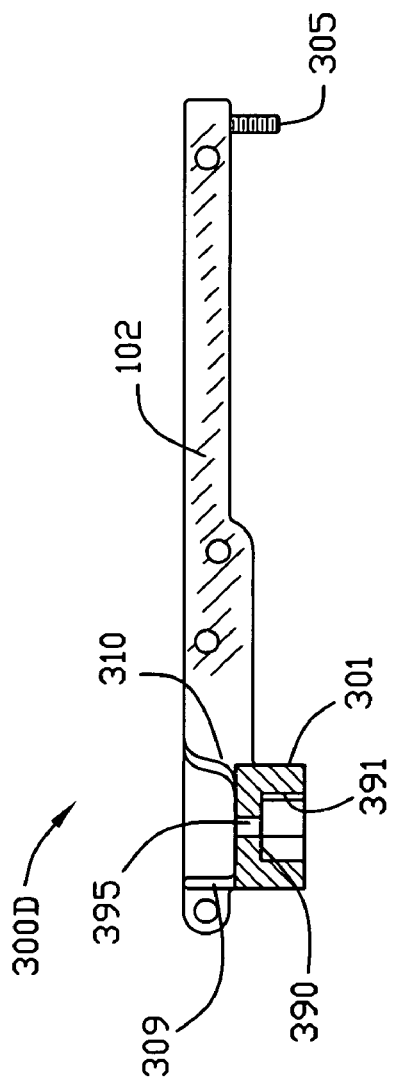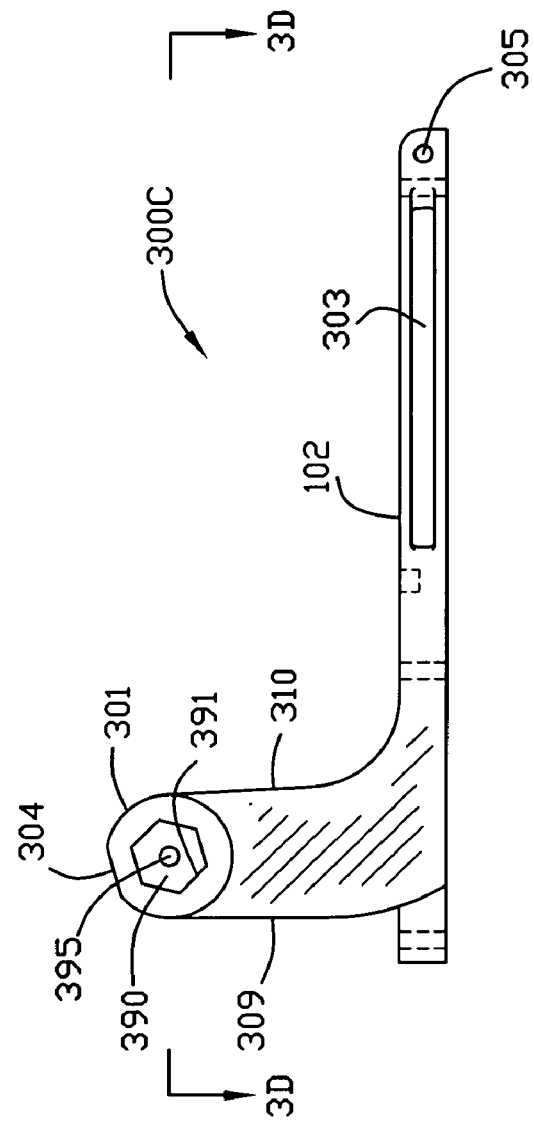
FIG. 3D
FIG. 3C

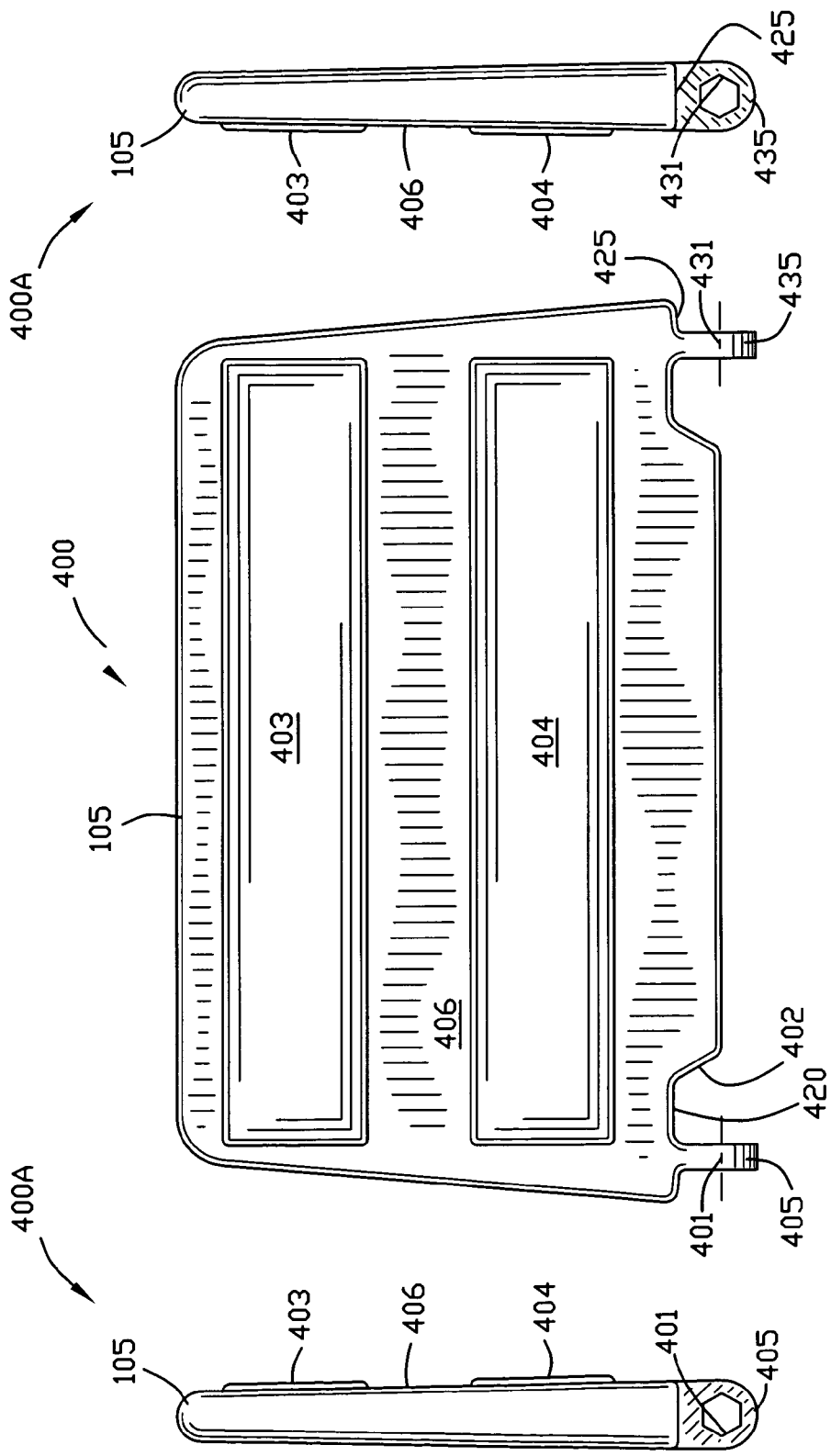

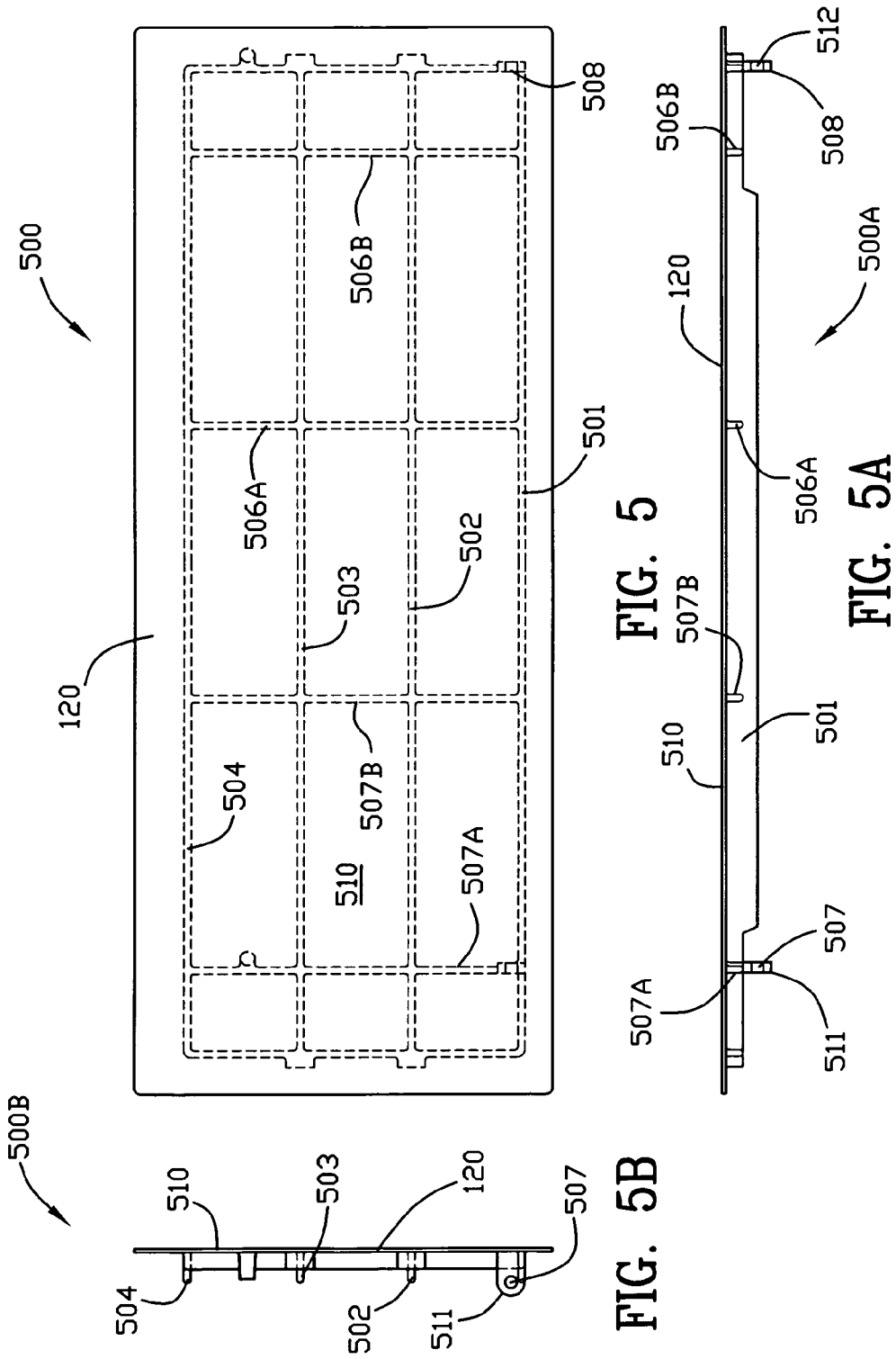

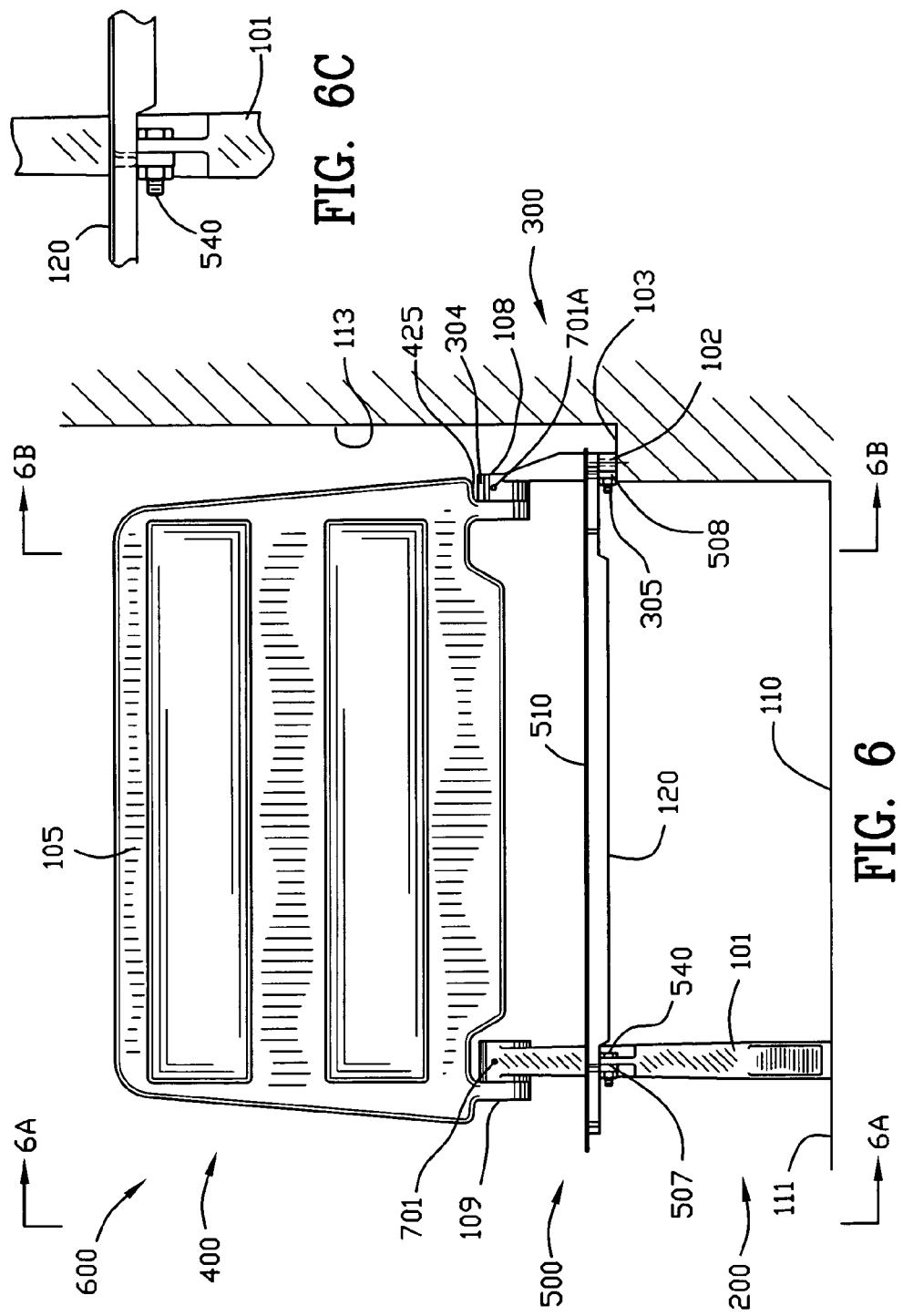

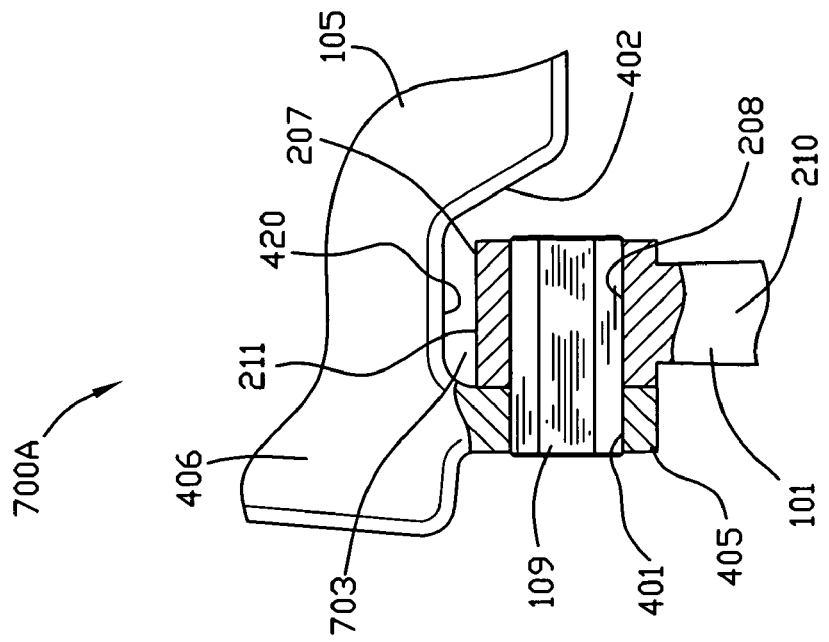
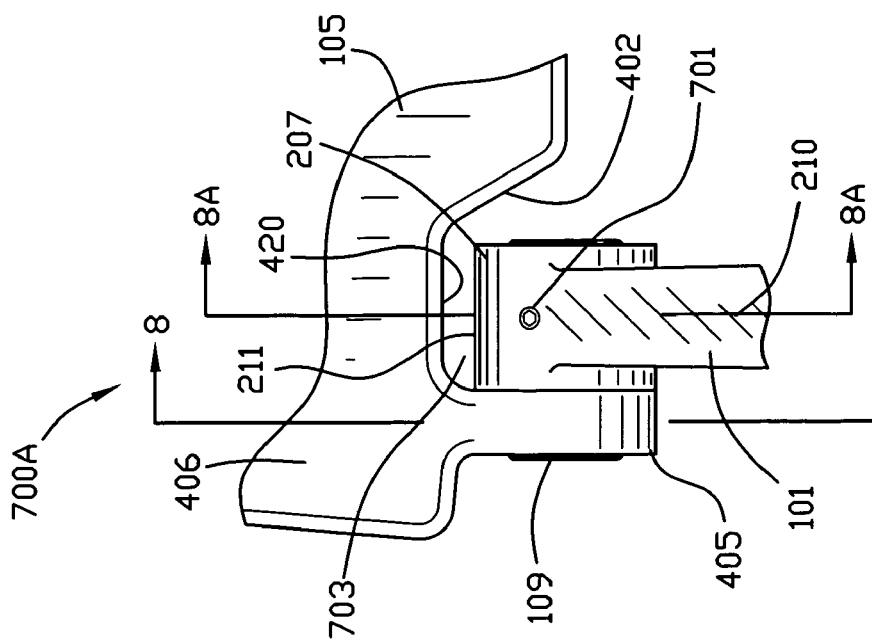

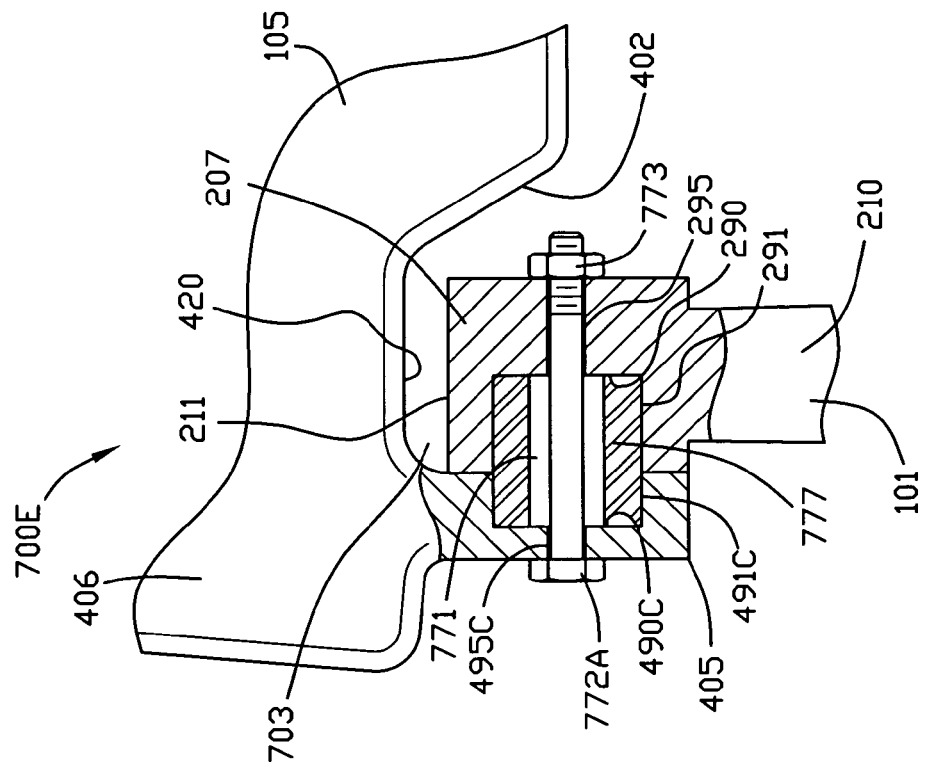
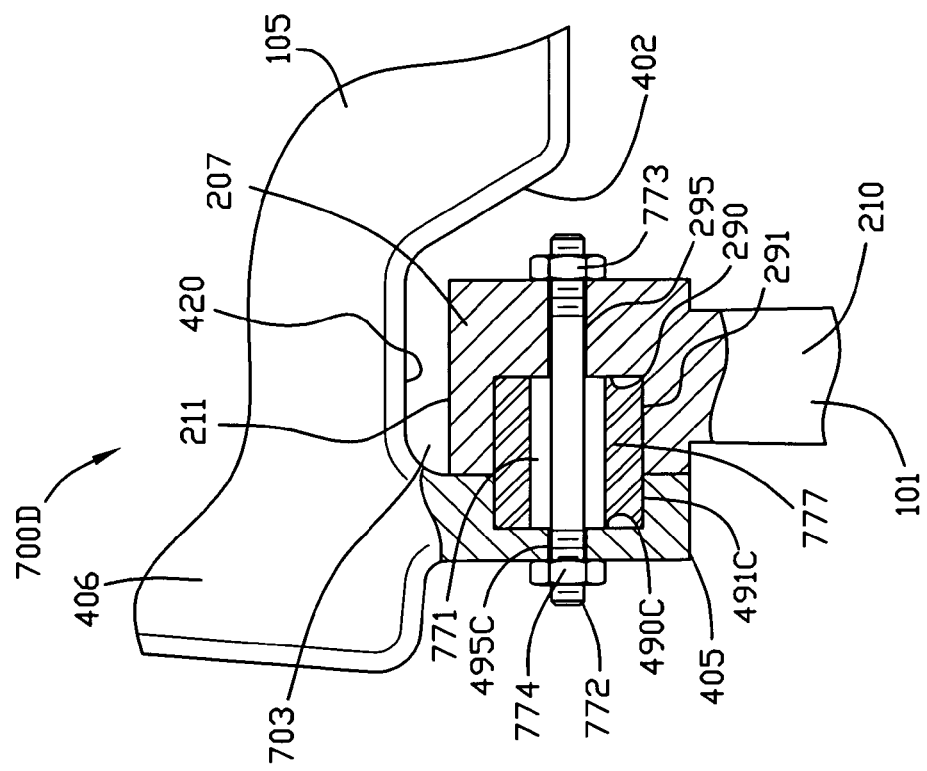

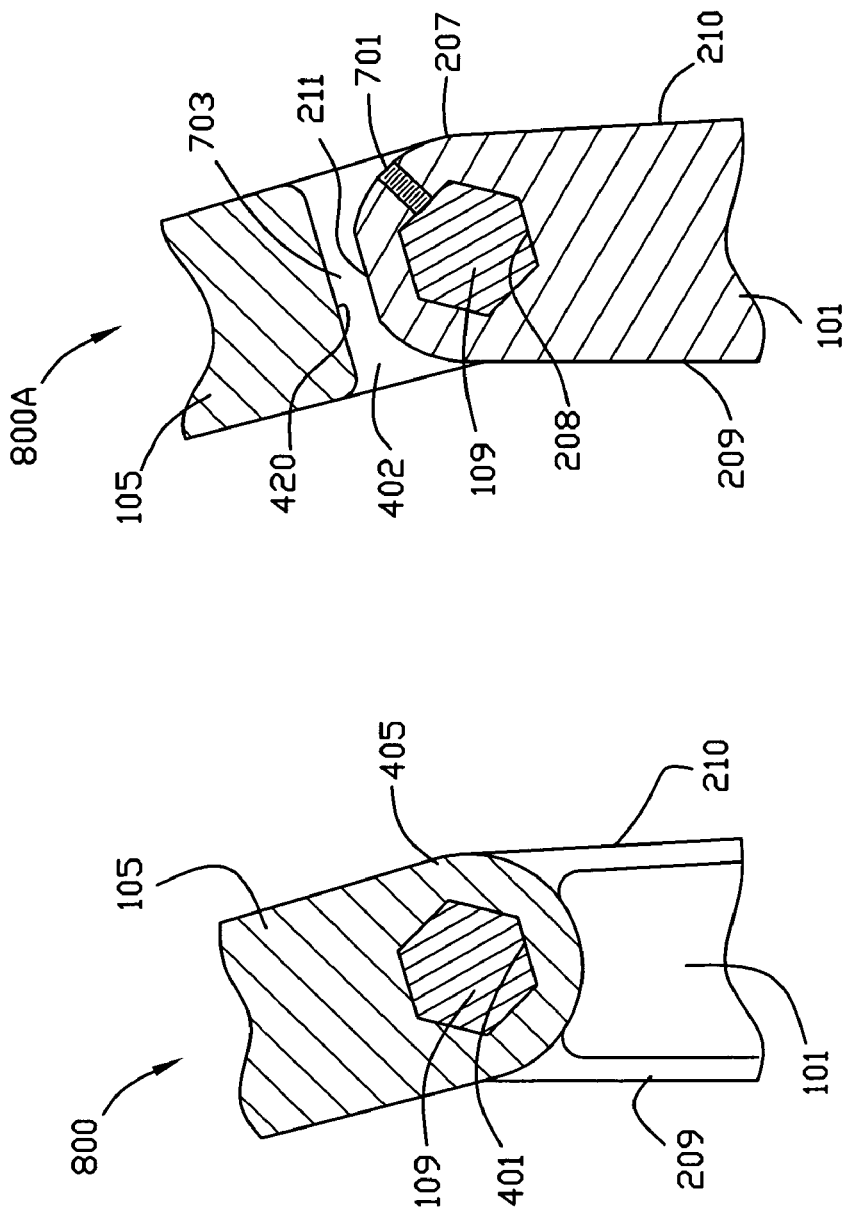

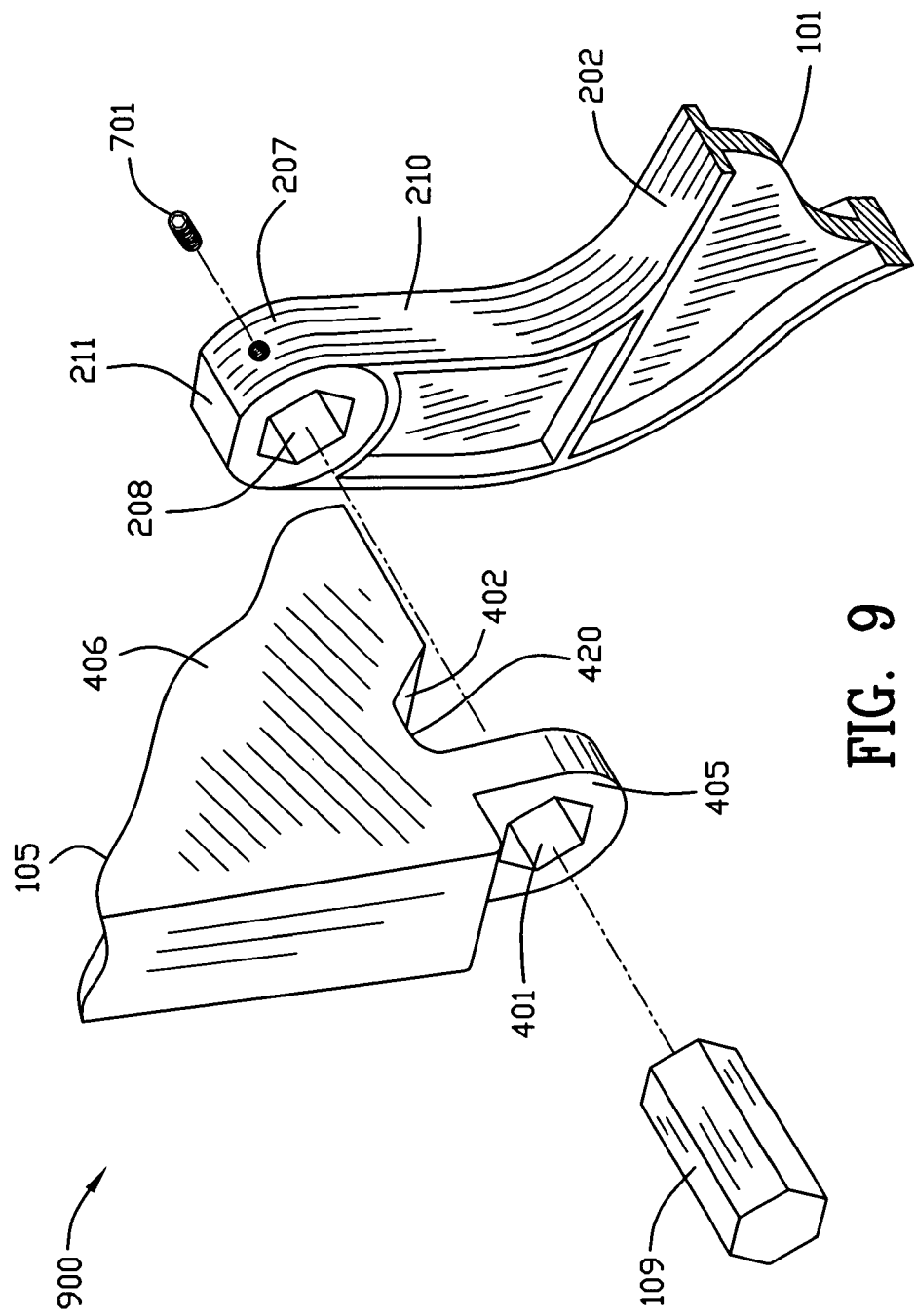

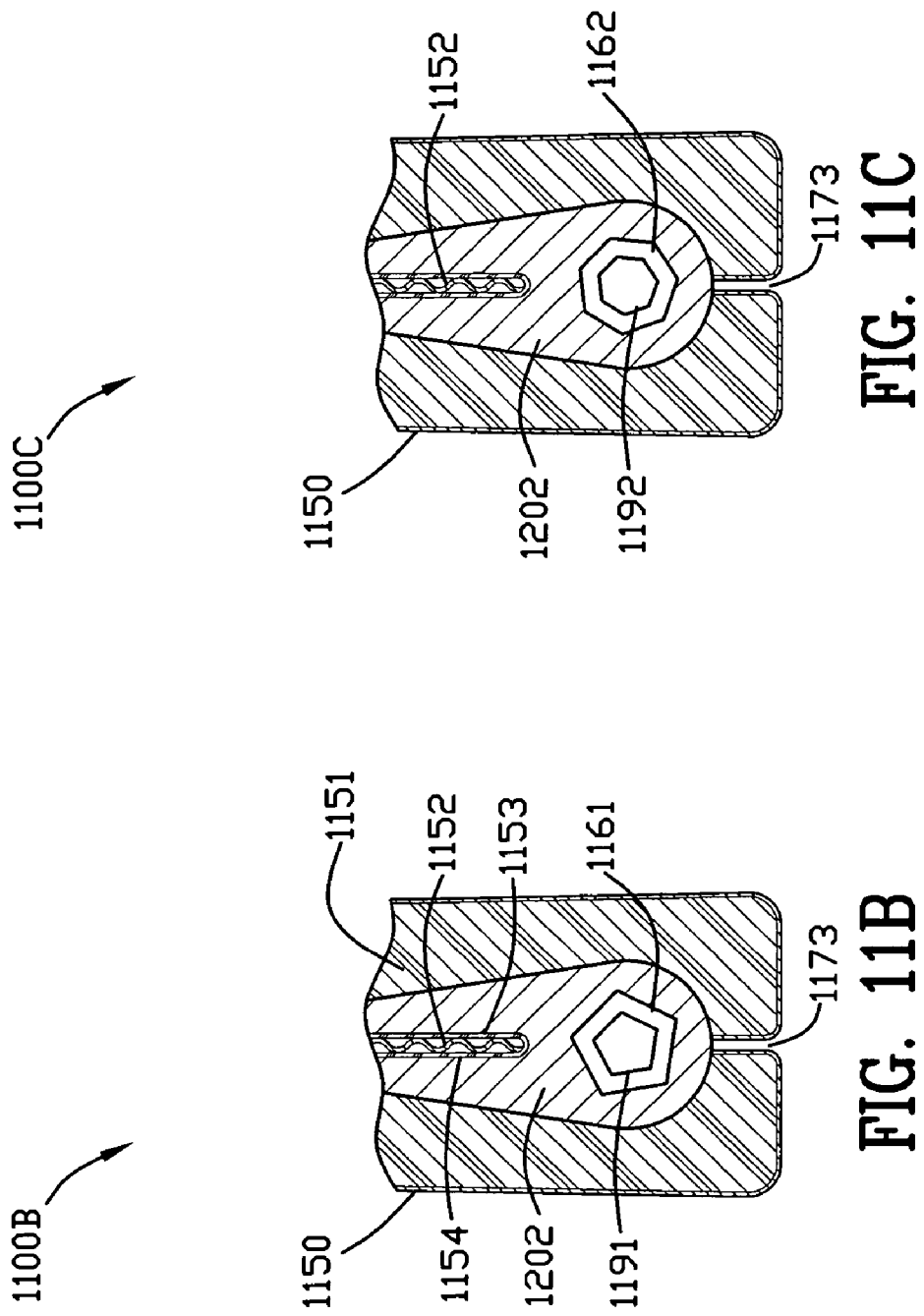

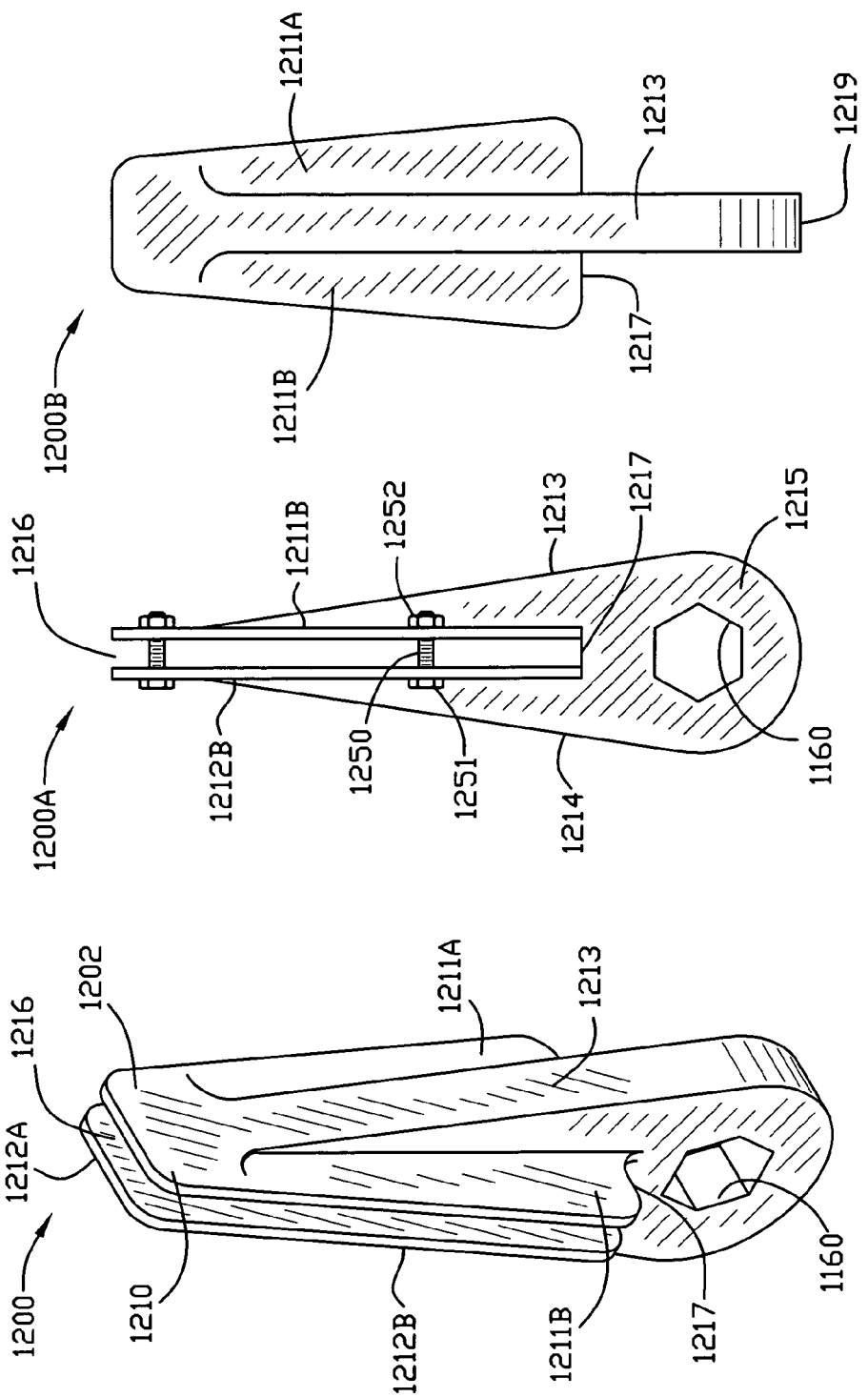

SCHOOL BUS SEAT WITH ENERGY ABSORBER

This patent application is a continuation-in-part of patent application Ser. No. 10/954,782 filed Sep. 30, 2004 now U.S. Pat. No. 7,338,119.

FIELD OF THE INVENTION

The invention is in the field of school bus seats which must meet federal regulatory standards to protect school bus riders, in particular, children riding on school buses.

BACKGROUND OF THE INVENTION

Present technology used in school bus seats is quite old. Essentially, school bus seats are presently made using metal or metal and wood. Wood or metal is secured to the metal seat back frame and metal frame bottom. A covering which may include some type of foam is also used. The covering and foam are subject to wear and tear as well as vandalism.

Some of the problems associated with the present technology are set forth in my U.S. Pat. Nos. 5,609,395 and 6,415,494, which I incorporate herein by reference. U.S. Pat. No. 6,415,494 is a divisional of application Ser. No. 08/530,451 filed on Sep. 18, 1995 now U.S. Pat. No. 5,609,395.

My U.S. Pat. No. 5,609,395 issued Mar. 11, 1997 disclosed and claimed a modular bus seat and method of retrofitting existing bus seats. My '395 patent discloses a bus seat comprising a metal frame, a bus seat back and a bus seat. My '395 patent discloses a bus seat back which includes a front modular portion, a rear modular portion, and a collar portion. The front modular portion is affixed to the metal frame. The rear modular portion is affixed to the front modular portion. The collar portion is affixed to the front modular portion adjacent the front and rear modular portions. The bus seat is affixed to the metal frame. The modular construction of the bus seat back enables replacement of a specific section or sections of the bus seat. The bus seat back and bus seat can be used in retrofit installations or in new installations using the existing metal frame technology. The bus seat back and bus seat are constructed of an elastomer skinned urethane foam which adheres to front, rear and bottom pieces of plywood. The collar portion is constructed of the elastomer skinned urethane foam but does not include a plywood portion. The collar portion is affixed to the front plywood portion.

My U.S. patent application Ser. No. 29/204,361 discloses a design for School Bus Seat Back Envelope Cushion and was filed on Apr. 28, 2004.

Federal Motor Vehicle Safety Standard No. 222 sets forth the safety standards for school bus seats. The safety standard addresses size, loading, energy absorption and deflection requirements.

U.S. Pat. No. 4,688,662 to Correll discloses an Energy Absorber System utilizing a pair of housings having facing cavities which includes a hollow deformable torsion member interconnecting the housings. One portion of the torsion member is received in the cavity of one housing and another portion of the torsion member is received in the cavity of the other housing. The housing cavities have cross-sectional conformations which receive the torsion member in such a manner that relative rotation therebetween is prevented. Rotation of one housing relative to the other deforms the torsion member elastically and/or plastically. Such deformation absorbs the energy of forces tending to rotate the housings. It will be noticed that Correll discloses a four-sided energy absorber. Use of such an absorber has the effect of creating knit lines in the plastic surrounding the energy absorber or torsion member. At column 5, lines 27 et seq. Correll states: "The torsion member again has a polygonal cross-sectional conformation so as to closely mate with the side walls of the cavities and thereby prevent relative rotation between the torsion member and the housings. As shown in FIG. 6, torsion member 90 comprises an elongated hollow tubular member with axial portions thereof received in the housings. The inner periphery 94 of the tubular member closely receives filling areas 96 which extend inwardly thereinto from a pair of opposed end caps 98. Filling areas 96 conform to the interior of torsion member 90 to shorten the effective length thereof (FIG. 6) for reasons previously described." Correll teaches that torsion members must be closely mated with respective cavities and that the torsion members may be filled to adjust the tolerance of the energy absorber from a torque standpoint. Correll contemplates use of a stampable fiber reinforced plastic for its housings and other materials. Knit lines are formed when fiber reinforced materials are molded and when obstructions to flow are present. When the flow path involves right angles knit lines are formed as the right angles provide an obstruction to flow. Knit lines do not integrate fibers with the polymeric material. Knit lines do not join the fibers together.

Although old school bus seats can be retrofitted and new seats can be manufactured as taught by my inventions as set forth in my '395 and '494 patents, it is highly desirable to provide a new school bus seat with superior safety performance and which is attractive and comfortable.

SUMMARY OF THE INVENTION

An energy absorber for a bus seat includes a hexagonally shaped pin which interengages both a hexagonally shaped aperture in a bus seat back and hexagonally shaped aperture in a support for the seat. Alternatively, a pentagonally shaped, heptagonally shaped or octagonally shaped pin may be used. The terms "pin, torsion member and fastener" are used synonymously and interchangeably herein. The hexagonal pin resides in the hexagonal apertures of the support and the bus seat back preventing rotation of the bus seat back with respect to the support. The pin is preferably hollow and is made of Aluminum and the supports and seat backs are made of a polymeric material or a material known as a plastic composite. Under forceful impact applied to the bus seat back, the bus seat will rotate limitedly in the direction of the force causing deformation of both the pin and the polymeric material (or plastic composite). A plastic composite is a combination of a polymer and a material such as a fiber which gives the plastic more strength. The deformation of the pin (torsional member) under forceful impact is a plastic deformation. When this limited rotation occurs, the polymeric material (or plastic composite) of the seat back and/or that of the support is deformed by the forceful rotation of the Aluminum hexagonally shaped pin (torsional member). Depending on the characteristics of the Aluminum pin, it may also deform during the forceful rotation of the seat back with respect to the support. Other pin materials may be used such as other metals and/or any one of a wide variety of polymeric materials may be used. The pins which are sometimes referred to herein as fasteners may also be made of a combination of metal and polymeric material or just a polymeric material. Preferably the seat back and the support are made of a thermoplastic material. However, thermoset materials may be used as the materials for the seat back and the support.

Each school bus seat has two energy absorbers. One of the energy absorbers is on the aisle side of the seat back and operates between the seat back and aisle leg or support. The other energy absorber is on the window side of the seat back and operates between the seat back and the window side support. The energy absorbers are used as a part of the school bus seat.

The bus seat includes an aisle support having a hexagonally shaped aperture or cavity and a window side support having a hexagonally shaped aperture or cavity. A bottom substrate or seat is hinged to the aisle support and the window support. The bus seat includes a seat back having a hexagonally shaped apertures or cavities. A hexagonally shaped pin or torsion member interengages the hexagonally shaped aperture or cavity of the aisle support and one of the hexagonally shaped apertures or cavities of the seat back. Another hexagonally shaped pin or torsion member interengages the hexagonally shaped aperture or cavity of the window side support and the other hexagonally shaped aperture or cavity of the seat back. The hexagonally shaped pins or torsion members in combination with the apertures prohibit rotation of the seat back with respect to the aisle and window side supports unless a forceful load as described above is applied. Preferably, the seat back and supports are made of a polymeric material. The hexagonally shaped cavities are manufactured without significant knit lines formed as the flowability of fiber reinforced polymeric material is enhanced.

Torsion members or pins may be used having a pentagonal, heptagonal or octagonal cross-sectional shape. The pentagonal, heptagonal or octagonal torsion members are preferably hollow and may be manufactured from a variety of metals and plastics. The bus seat includes a seat back and aisle and window supports having correspondingly shaped apertures or cavities so as to receive the torsion members.

An envelope style bus seat back cushion may be employed over a plurality of seat back configurations. The seat back may comprise a substrate which is solid throughout made from composite thermoplastic or thermoset polymers. Alternatively, the seat back may be made from a reinforced substantially hollow sandwich composite. The sandwich composites may include two polyurethane composite planar surfaces separated by a core material. When sandwich composites are used they may be bolted, adhesively bonded or ultrasonically welded to the brackets.

Alternatively, it is within the scope of this invention to use a solid reinforced polymer seat back supported by the seat back brackets.

A school bus seat comprises a pin having a cross-sectional shape selected from the group consisting of a pentagon, a hexagon, a heptagon and an octagon. First and second brackets include an aperture selected correspondingly from the group consisting of a pentagon, a hexagon, a heptagon and an octagon. First and second supports include an aperture selected correspondingly from the group consisting of a pentagon, a hexagon, a heptagon and an octagon. The apertures in the brackets and supports are formed in a fiber reinforced polymer such that the apertures are devoid of knit lines. The pins reside in the apertures of the supports and brackets inhibiting rotation of the brackets with respect to the supports. A seat back is secured to the brackets.

Two components of the school bus seat, namely, the seat bottom and the seat back can be manufactured by adhering an elastomeric skinned foam directly to a substrate. A mold is first coated by spraying an elastomeric skin on the interior thereof. Next, the seat bottom or the seat back is inserted into the mold and positioned and held properly by devices which are not described herein. Then a polyurethane foam is blown into the cavity between the seat bottom or the seat back and the elastomeric coated mold. The seat bottom or seat back may be a solid reinforced polymer. Alternatively, the seat bottom or the seat back may be a sandwich composite formed by two spaced apart polyurethane substrates separated by and affixed to a low density core.

A school bus seat comprising a one-piece twin bucket seat with deformable brackets supporting both sides of the seat is also disclosed and claimed.

A school bus seat comprising a superstructure having vertical left and right side supports for supporting a seat back is also disclosed and claimed. Each of the side supports includes a fuse and the fuses are inelastically deformable upon the application of force to the superstructure.

A school bus seat comprising a one-piece twin bucket seat having left and right sides thereof is also disclosed and claimed. The bucket seats include a seat bottom portion and a seat back portion. The seat bottom and back portions are primarily isotropic glass. A first strip of directionalized glass and a second strip of directionalized glass are embedded within the seats proximate the left and right sides thereof and extend from the seat bottom portion to the seat top portion. Upon impact the directionalized glass strips are inelastically deformable.

A method of manufacturing a seat back to be used in a school bus seat is also disclosed and claimed. The interior of the mold is first coated with a spray elastomer. Next, the superstructure of the seat back is attached to the seat back brackets and the seat back and a portion of the seat back brackets is inserted into the mold. Urethane is the injected into the mold and the urethane adheres to the superstructure of the seat back.

The superstructure of the seat back may comprise a polyurethane composite surface separated by and affixed to a low density core or it may be a solid reinforced polymer. Another component such as a seat bottom may be made from substantially the same process.

It is an object of the present invention to provide energy absorbers in school bus seats enabling the seats to meet or exceed the Federal Motor Vehicle Safety Standard 222.

It is a further object of the present invention to provide a school bus seat having a superstructure which is substantial and durable and still has the ability to absorb energy, both forward or rearward to meet or exceed Federal Motor Vehicle Safety Standard 222.

It is a further object of the present invention to provide a school bus seat having a seat back pinned to supports such that the pins cause deformation of the bus seat back and the supports when large magnitude loads are applied to the school bus seat back.

It is a further object of the present invention to provide a school bus seat having a seat back fastened to supports such that the fasteners are deformed along with the bus seat back and the supports when large magnitude loads are applied to the school bus seat back.

It is a further object of the present invention to provide a school bus seat having an energy absorber which includes a hollow hexagonally shaped torsion member.

It is a further object of the present invention to provide a school bus seat having an envelope style back seat cushion which is molded from polyurethane and elastomers and/or then is over sprayed with an elastomeric polymer spray to reduce surface imperfections.

It is a further object of the present invention to provide a geometry for the cavities of plastic composite materials such that their flowability is improved reducing the probability of knit lines.

It is a further object of the present invention to provide a seat back or seat bottom made of a solid reinforced polymer having urethane affixed directly thereto with an elastomeric coating over the urethane.

It is a further object of the present invention to provide a seat back or seat bottom made of a sandwich composite having urethane affixed directly thereto with an elastomeric coating over the urethane.

A better understanding of these and other objects will be had when reference is made to the Brief Description Of The Drawings and the Description Of The Invention which follow hereinbelow.

BRIEF DESCRIPTION OF THE DRAWINGS

FIG. 2 is a side view of the aisle support.

FIG. 2A is a front view of the aisle support of FIG. 2.

FIG. 2B is a top view of the aisle support of FIG. 2.

FIG. 2C is a side view of another embodiment of an aisle leg or support illustrating a head portion having a cavity therein and an aperture therethrough.

FIG. 2D is a cross sectional view taken along the lines 2D-2D of FIG. 2C illustrating the head portion thereof having a cavity therein and an aperture therethrough.

FIG. 3 is a side view of the window side support.

FIG. 3A is a top side view of the window side support of FIG. 3.

FIG. 3B is a rear view of the window side support of FIG. 3.

FIG. 3C is a side view of another embodiment of a window side support illustrating the head portion thereof having a cavity therein and an aperture therethrough.

FIG. 3D is a cross sectional view taken along the lines 3D-3D of FIG. 3C illustrating the head portion thereof having a cavity therein and an aperture therethrough.

FIG. 4 is a front view of the seat back.

FIG. 4A is a left side view of the seat back.

FIG. 4B is a right side view of the seat back.

FIG. 5 is a top view of the seat.

FIG. 5A is a front view of the seat base.

FIG. 5B is left side view of the seat base.

FIG. 6 is a front view of the superstructure of the seat illustrating the aisle support, the window side support, the seat and the seat back.

FIG. 6C is an enlarged view of a portion of FIG. 6 illustrating the hinging of the seat to the aisle support.

FIG. 7 is an enlarged front view of one of the energy absorbers illustrating a set screw in the neck portion of the aisle support as well as portions of the seat back.

FIG. 7A is an enlarged cut-away front view of the energy absorber of FIG. 7.

FIG. 7D is an enlarged cut-away front view of a hollow hexagonal torsion member positioned within cavities of the head portion of the aisle leg support and the coupling head of the seat back with a threaded rod and nuts securing the torsional member in place.

FIG. 7E is an enlarged cut-away front view of a hollow hexagonal torsion member positioned with cavities of the head portion of the aisle leg support and the coupling head of the seat back with a bolt and a threaded rod securing the torsional member in place.

FIG. 8 is a cross-sectional view taken along the lines 8-8 of FIG. 7 illustrating the energy absorber.

FIG. 8A is a cross-sectional view taken along the lines 8A-8A of FIG. 7.

FIG. 9 is an assembly view of the aisle side energy absorber illustrating the hexagonally shaped pin, the aperture in the seat back and the aperture in the aisle support.

FIG. 11B is a cross-sectional view illustrating a pentagonal pin.

FIG. 11C is a cross-sectional view illustrating a heptagonal pin.

FIG. 12 is a perspective view of one of the brackets illustrated in FIG. 11.

FIG. 12A is a side view of one of the brackets illustrated in FIG. 11.

FIG. 12B is a front view of one of the brackets illustrated in FIG. 11.

A better understanding of the drawings will be had when reference is made to the Description Of The Invention and Claims which follow hereinbelow.

DESCRIPTION OF THE INVENTION

Figures 1, 1A, 1B:
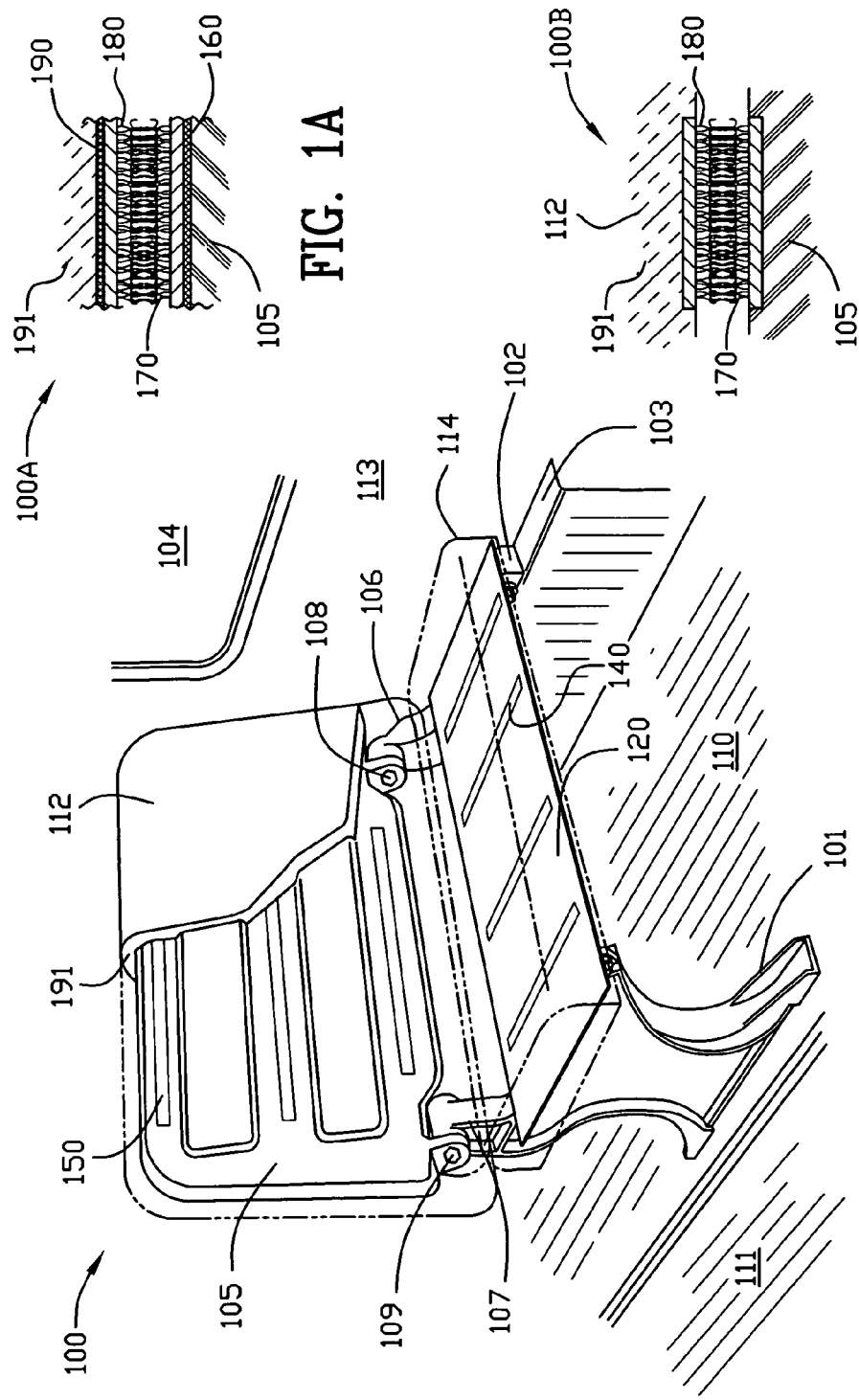
FIG. 1 is a perspective view of the front of the bus seat.
FIG. 1A is a schematic of the Velcro securement of seat cushions to a polymeric substrate or component such as a seat back or a seat.
FIG. 1B is a schematic of the Velcro securement of cushions molded to plastic or polymeric substrates or components such as a seat back or a seat.

FIG. 1 is a perspective view 100 of the front of the bus seat positioned in a bus. Aisle 111 and bus window 104 are illustrated in FIG. 1. Seat base or support 120 is hingedly affixed to aisle leg or support 101 and window leg or support 102. The floor beneath the bus seat is denoted by reference numeral 110, the side of the bus is denoted by reference numeral 113, and the window side rail 103 sits beneath support 102.

Aisle support 101 includes a fastener portion 107 which is fastened to seat back 105 by hexagonally shaped pin 109. Window side support 102 includes a fastener portion 106 which is fastened to seat back 105 by hexagonally shaped pin 108. Aisle support 101 is affixed to the floor and window support 102 is affixed to the window side rail 103. Preferably the supports are thermoplastic materials (or plastic composite materials) which are fastened to the floor with staple items of commerce such as nuts and bolts. Preferably the seat 120 and seat back 105 are thermoplastic materials or plastic composite materials.

Still referring to FIG. 1, reference numeral 112 is an envelope style bus seat back cover which is affixed to the seat back 105 through the use of Velcro®, which is believed to be a registered trademark of Velcro Industries, B. V. of the Netherlands. Referring to FIG. 1A, a schematic 100A of the usage of Velcro to affix the cushion to the seat back and seat bottom, adhesive 160 is applied to the polymeric substrate such as the seat back 105. Velcro 170 is thus affixed to the bus seat back 105. Similarly, Velcro is also affixed to the polyurethane foam 191 of seat back cushion 112 by adhesive 190. When the respective strips of Velcro interengage, the seat back cushion is securely affixed to the seat back. Removal and replacement of the envelope style seat back cushion is facilitated by this attachment structure and method.

Still referring to FIG. 1, strips 150 of Velcro may be strategically placed on the seat back 105 so as to ensure a tight and snug fit of the seat back cushion. Similarly, Velcro strips 140 may be placed on the seat 120 to secure the seat cushion 114 to the seat 120. FIG. 1B is a schematic 100B of the Velcro securement of a seat cushion to a polymeric or polymeric substrate or component such as a seat back or a seat wherein the Velcro has been molded to the substrate and to the cushion. FIG. 1B illustrates the Velcro strips 170, 180 molded into the back support 105 and the cushion 112.

Figures 6A, 6B:
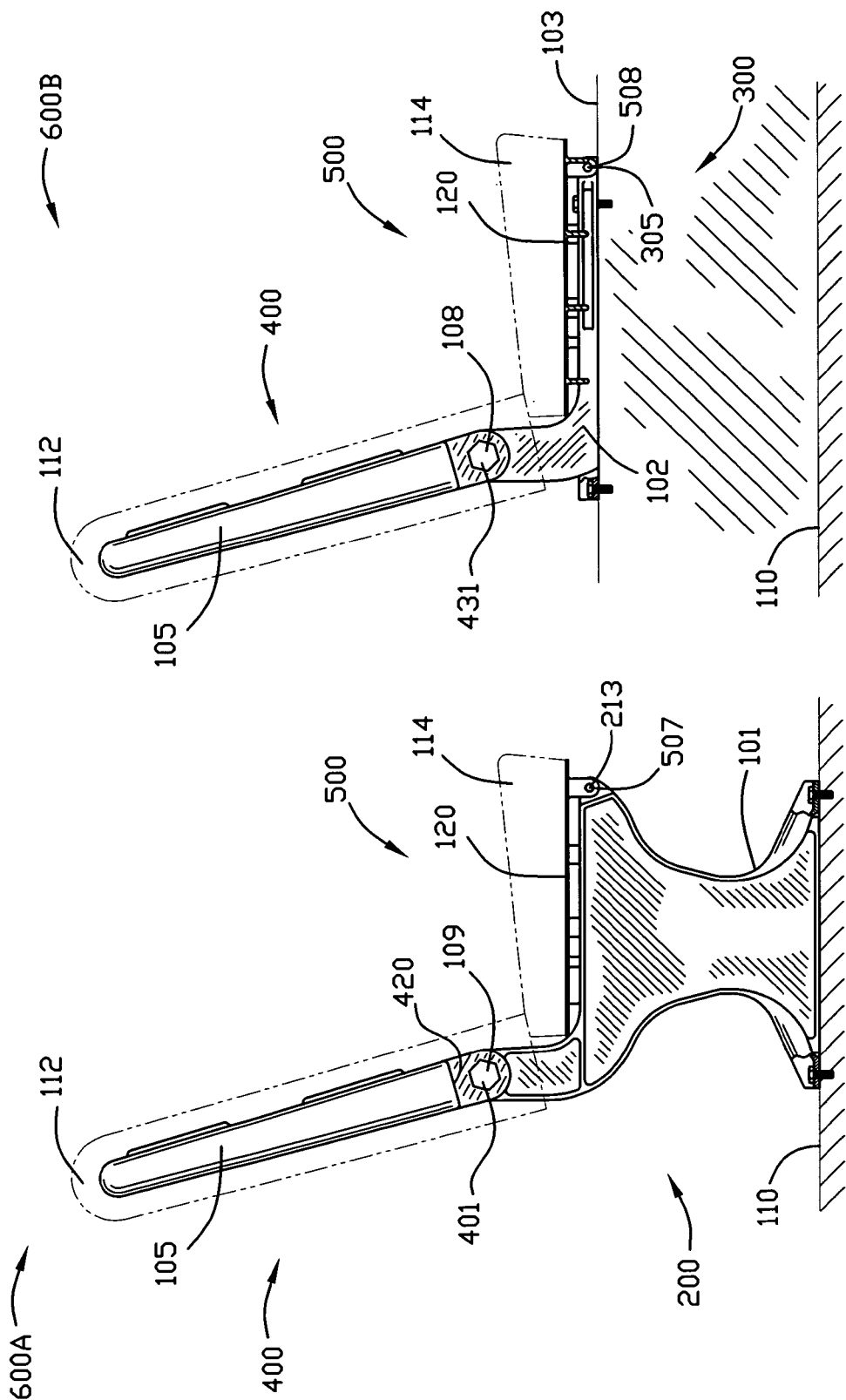
FIG. 6A is a side view taken along the lines 6A-6A of FIG. 6.
FIG. 6B is a cross-sectional view taken along the lines 6B-6B of FIG. 6.

FIG. 2 is a side view 200 of the aisle support 101 illustrating a bottom 204 and a top 202. Aperture 213, which is located generally in the frontal hinge portion of the aisle support 101, cooperates with a bolt or pivot 507 as best shown in FIG. 6A to enable seat 120 to be rotated in a clockwise direction to enable cleaning of the seat. Bottom 204 of the aisle support 101 is fastened to the floor of the school bus as illustrated in FIG. 1. Those skilled in the art will recognize that there are many techniques for fastening or securing the aisle support 101 to the floor of the school bus. For instance, it may be bolted, strapped, screwed or fused to the floor of the school bus.

Referring still to FIG. 2, the central portion 230 of the school bus seat is thinner in cross section than the feet illustrated by reference numerals 203, 205 and 206. Having broad feet, 203, 206, adds stability to the seat structure. Reference numeral 201 illustrates a rim portion slightly wider than the foot portion 203. This can be viewed in FIG. 2A, which is a front view 200A of the aisle support 101 of FIGS. 1 and 2.

FIG. 2B is a top view 200B of the aisle support 101 of FIGS. 1 and 2. Referring to FIGS. 2, 2A and 2B, aperture 208 is illustrated in head portion 207. In FIG. 2, the aperture 208 is illustrated as hexagonally shaped in cross section and aperture 208 extends the length of head portion 207. In other words aperture 208 extends through the head portion 207. A neck portion defined by rims 209 and 210 are illustrated in FIGS. 2, 2A and 2B and this neck portion supports the head portion 207. It will be noted that head portion 207 includes a flat portion 211 which allows clearance with respect to reciprocally flat shaped portion 420 of the seat back as illustrated in FIG. 6. Additionally, these reciprocal flat portions also limit the degree of rotational movement of the seat back with respect to the aisle support 101 upon forceful impact to the seat. Forceful impact is that impact which would occur in accident conditions and is defined in Federal Motor Vehicle Safety Standard 222.

FIG. 2C is a side view 200C of another embodiment of an aisle leg or support illustrating a head portion 207 having a hexagonally shaped cavity 291 therein and an aperture or bore 295 therethrough. FIG. 2D is a cross sectional view 200D taken along the lines 2D-2D of FIG. 2C illustrating the head portion 207 thereof having a hexagonally shaped cavity 291 therein and an aperture or bore 295 therethrough. It will be noted that the cavity does not extend through the head 207, rather, it terminates in a substantially flat face 290. Cavity 291 is sometimes referred to herein as the first cavity. First cavity 291 is hexagonally shaped and it is shaped this way so as to eliminate knit lines which are formed when composites are made with abrupt surfaces configurations.

FIG. 3 is a side view 300 of the window side support 102. Apertures illustrated in the window side support enabling affixation to the school bus side rail 103. The window side rail may be affixed to the bus side rail 103 as described above. Referring still to FIG. 3, a neck portion defined by reference numerals 309, 310 supports head portion 301. Head portion 301 includes a hexagonally shaped in cross section aperture 302 which extends the length of the head. In other words, the aperture 302 extends through the head portion 301. Similar to flat portion 211 of head 207 of the aisle leg, a flat portion 304 cooperates with flat portion 425 of the seat back to limit the rotational movement of the seat with respect to the window support 102.

Referring to FIG. 3, reference numeral 303 illustrates a molded cavity in the window support 102.

FIG. 3A is a top side view 300A of the window side support of FIG. 3. FIG. 3B is a rear view 300B of the window side support of FIG. 3. Referring to FIG. 3 and 3A, bolt 305 is illustrated in an unnumbered aperture. The head of the bolt is not shown and is molded as part of the window support 102. Bolt 305 extends through side support 102 and passes through aperture 512. See FIGS. 5A and 6B.

FIG. 3C is a side view 300C of another embodiment of a window support illustrating the head portion 301 thereof having a second hexagonally shaped cavity 391 therein and an aperture or bore 395 therethrough. Cavity 391 terminates in a substantially flat face 390. FIG. 3D is a cross sectional view 300D taken along the lines 3D-3D of FIG. 3C illustrating the head portion 301 thereof having cavity 391 therein and an aperture 395 therethrough. Cavities 391 and 291, previously described above, receive hexagonally shaped pins or torsion members as will be described below.

FIG. 4 is a front view 400 of the seat back 105 illustrating protrusions 403, 404 and land 406 on the front side thereof. Referring to FIG. 4A, a left side view 400A of the seat back, coupling head portions 405 and 435 are illustrated. Apertures 401, 431 of coupling heads 405, 435 are hexagonally shaped and extend the length of the head portions 405, 435 of the seat back 105. Apertures 401, 431 align with the apertures 208, 302 of head portions 207, 301 of the aisle support 101 and window support 102, respectively. Hexagonally shaped pins 109, 108 are inserted through the aforementioned apertures so as to make a tight fit. The pins may be slightly oversized necessitating a slight pressure to push them through the respective apertures during assembly of the seat. For molding the respective heads, it has been found that a hexagonal shape is practical and works well and improves the flowability of fiber reinforced polymers.

FIG. 4B is a right side view 400B of FIG. 4. Referring again to FIGS. 4 and 4B, flat surface 425 corresponds to flat surface 304 on window support 102. It will be noticed from FIGS. 1 and 6 that coupling head 435 is located interiorly with respect to head portion 301 while coupling head 405 is located exteriorly with respect to head portion 207. This orientation is being illustrated by way of example only and those skilled in the art will readily recognize that the coupling head 425 could also be located exteriorly with respect to head 301 of the window support. In other words coupling head 425 could be located closer or adjacent to the side of the bus wall 113. Further, those skilled in the art will readily recognize that both couplings heads could be located interiorly with respect to the head portions of the supports.

Figure 4D:
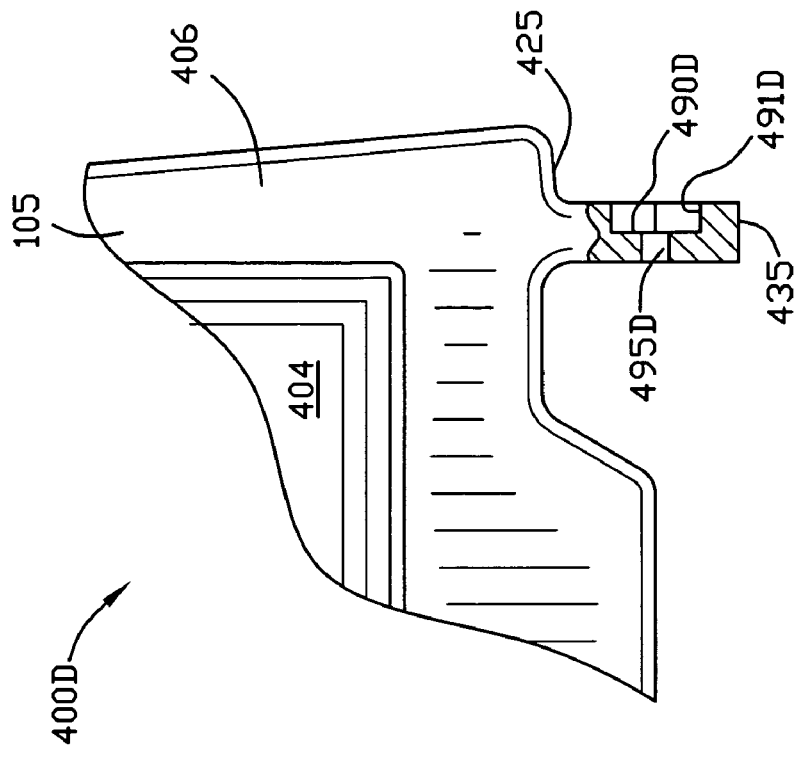
FIG. 4D is a front view of the seat back illustrating the right coupling head in cross section.
Figure 4C:
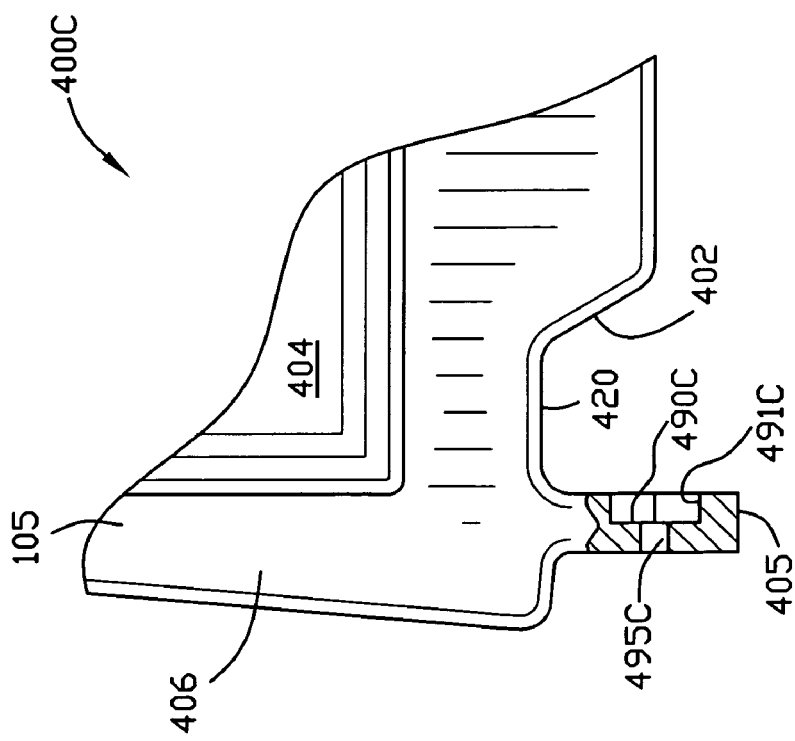
FIG. 4C is a front view of the seat back illustrating the left coupling head in cross section.
Figure 9A:
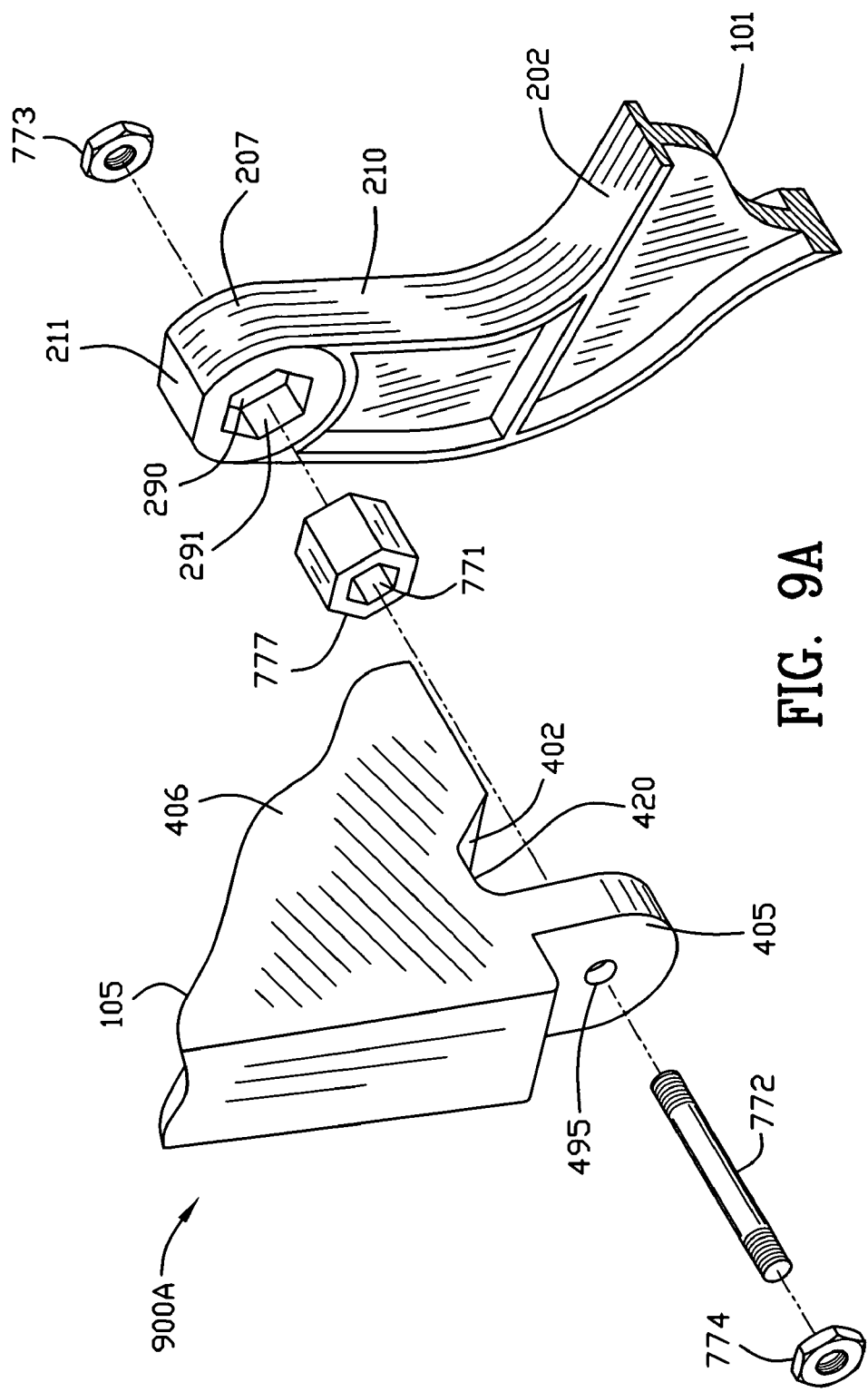
FIG. 9A is an assembly view of the aisle side energy absorber illustrating a hollow hexagonally shaped pin, the threaded rod, and the cavity in the aisle support leg.

FIG. 4C is a front view 400C of the seat back 105 illustrating the left coupling head 405 in cross section. Cavity 491C, sometimes referred to herein as third cavity 491C terminates in substantially flat face 490C. Bore or aperture 495C extends through head 405. Third cavity 491C faces first cavity 291. See FIGS. 7D and 7E. FIG. 7D is an enlarged cut-away front view 700D of a hollow hexagonal torsion member 777 positioned within the first 291 and third 491C cavities of head portion 207 of the aisle leg support and the coupling head portion 405 of the seat back 105 with a threaded rod 772 and nuts 773, 774 securing the torsional member 777 in place. Torsional member 777 is hexagonally shaped and hollow. Alternatively, torsional member 777 may be shaped so as to provide an aperture therethrough just large enough for rod 772 to pass therethrough. The preferred embodiment of torsional member 777 includes a hexagonally shaped in cross section aperture 771 therethrough. FIG. 9A illustrates the torsional member 777 and its hexagonally shaped aperture 771 which extends therethrough. Torsional member 777 may be slightly oversized such that its outer hexagonal perimeter exceeds the perimeter of the hexagonally shaped first and second cavities. In other words, the cross sectional area of the torsional member is larger than the cross sectional areas of the first and second cavities. In this instance, the torsional member may have to be forcefully urged into the first and second cavities.

FIG. 7E is an enlarged cut-away front view 700E of a hollow hexagonal torsion member 777 positioned within the cavities 491C, 291 of the head portion 207 of the aisle leg support 101 and the coupling head 405 of the seat back 105 with a bolt 772A, a threaded rod 772 extending from the bolt, and a nut 773 securing the torsional member 777 in place.

FIG. 4D is a front view 400D of the seat back 105 illustrating the right coupling head 435 in cross section. Fourth cavity 491D terminates in substantially flat face 490D. Aperture or bore 495D extends through coupling head 435 enabling the securement of torsional member 777 between the coupling head 435 and the head portion 301 of the window support as illustrated by way of example in FIGS. 7D and 7E. Fourth cavity 491D is in facing relationship to second cavity 391.

FIG. 5 is a top view 500 of the seat 120. Surface 510 is a polymeric planar surface supported by latitudinal ribs 501, 502, 503 and 504. Longitudinal ribs 507A, 507B, 506A and 506B also support the surface 510. Hinge 511 of seat 120 coacts with the frontal hinge portion of the aisle support 101. Hinge 511 includes aperture 507 therein and is aligned with aperture 213 in the frontal hinge portion of the aisle support 101. See, FIG. 6A. Hinge 508 includes aperture 512 therein and includes bolt 305 as illustrated in FIGS. 6 and 6B. FIG. 5A is a front view 500A of the seat base 120 and FIG. 5B is left side view 500B of the seat base.

FIG. 6 is a front view 600 of the superstructure of the seat illustrating the aisle support 101, the window side support 102, the seat 120 and the seat back 105. Just the superstructure of the bus seat is illustrated in FIG. 6. Cushions 112, 114 are illustrated in phantom in FIGS. 6A and 6B.

FIG. 6A is a side view 600A taken along the lines 6A-6A of FIG. 6 illustrating the aisle support 101 and the seat hinge. FIG. 6B is a cross-sectional view 600B taken along the lines 6B-6B of FIG. 6 illustrating the window support 102 and the seat hinge. The seat 120 hinges forward to rotate in a clockwise direction to enable cleaning beneath the seat. Protrusions in the seat 120 mate with corresponding unnumbered apertures in the aisle and window supports. This adds stability to the seat and helps to keep it in place. The protrusions in the bottom of the seat may be oversized with respect to the mating apertures in the supports so as to provide an interference fit.

FIG. 6A provides a view of the pin 109 residing partially in aperture 401. When a force of sufficient magnitude is applied to the seat back 105, it tends to cause rotation of the seat in the direction of the force. For instance, if the force is applied from the rear of the seat toward the front of the seat, the seat back 105 is urged to be rotated in a clockwise direction against the fasteners or pins 109, 108. If the force is applied from the front of the seat toward the rear of the seat, the seat back 105 is urged to be rotated in a counterclockwise direction against the fasteners or pins 109, 108. In any event, if the seat back 105 is rotated relative to the aisle support, the polymeric material surrounding the pin will be deformed by the pin. Additionally, the pins, although manufactured of metal, will also be deformed depending on their hardness and the hardness of the polymeric material. FIG. 6B provides a view of the pin 108 residing partially in aperture 431. Depending on the geometry of the pin or torsion member, the deformation of the torsion member is controlled. The size and material of the pin are factors as well as the geometry (i.e., a hollow hexagonal geometry as illustrated in FIG. 9A).

FIG. 6C is an enlarged view of a portion of FIG. 6 illustrating in greater detail the hinging of the seat to the aisle support.

FIG. 7 is an enlarged front view 700 of one of the energy absorbers illustrating a set screw 701 in the neck portion 210 of the aisle support 101 as well as portions of the seat back 105. Set screw 701 secures pin 109 in place within the respective apertures of the seat back and the head of the aisle support. Further, as explained above, flat portion 211 of head 207 of the aisle support, if mounted closely enough to flat portion 420 of the seat back 105, will minimize gap 703 and result in support of the flat portions upon the rotational movement of the seat back with respect to the aisle support. As mentioned hereinabove, the pin 109 may be oversized with respect to the apertures in which it resides. As such, the installation of the pins may require pressure or force to force fit the pin into its respective aperture.

Figure 7C:
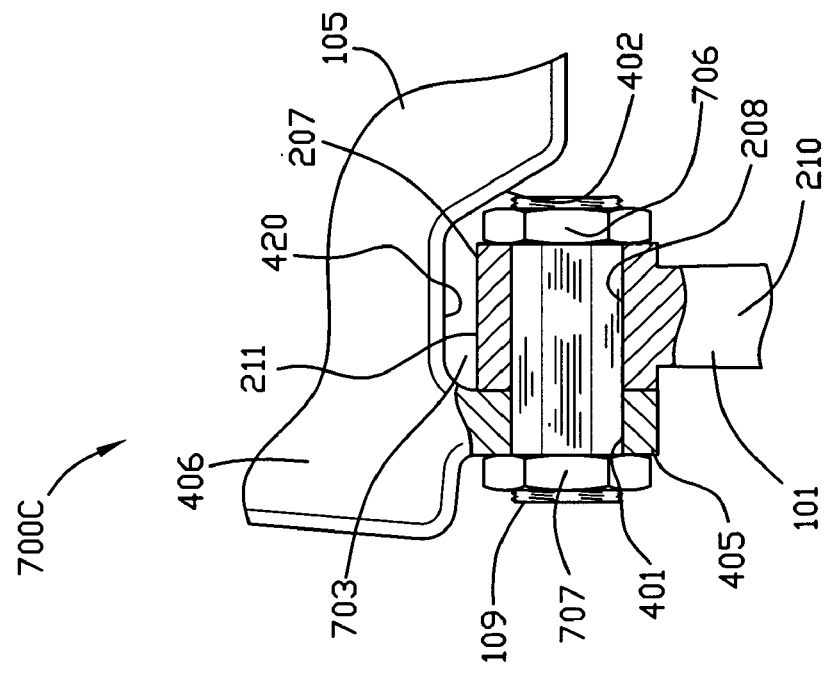
FIG. 7C is an enlarged cut-away front view of the energy absorber illustrating a threaded pin and nuts for securing the pin in place.
Figure 7B:
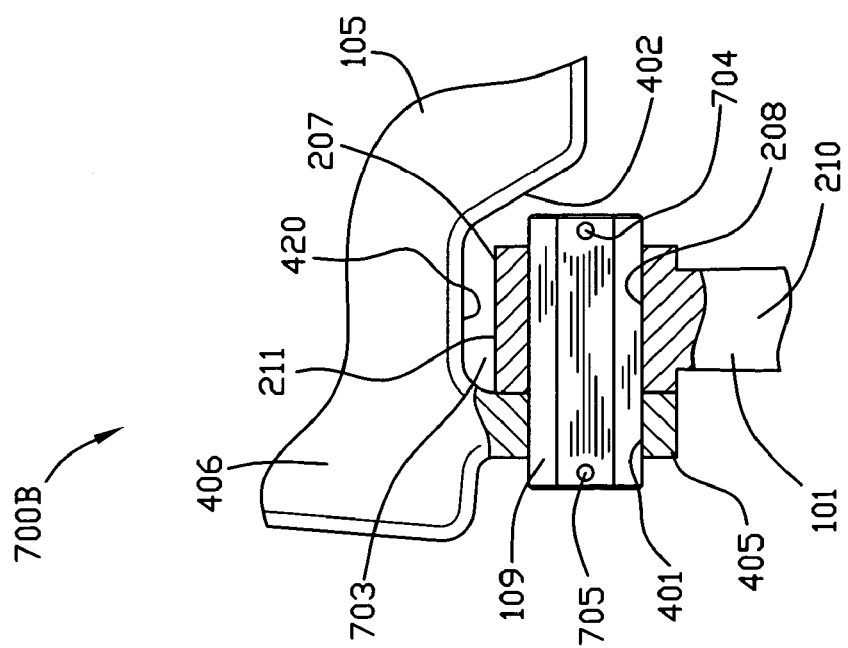
FIG. 7B is an enlarged cut-away front view of the energy absorber of FIG. 7 illustrating pin holes and pins for securing the hexagonal pin in place.

FIG. 7A is an enlarged cut-away front view 700A of the energy absorber of FIG. 7. FIG. 7B is an enlarged cut-away front view 700B of the energy absorber of FIG. 7 illustrating pin holes and pins 704, 705 securing pin 109 in place. With both pins in place the pin 109 cannot move in either the leftward or the rightward direction.

FIG. 7C is an enlarged cut-away front view 700C of the energy absorber illustrating a threaded pin and nuts 706, 707 for securing the pin 109 in place. In this embodiment nut 706 would be threaded onto pin 109 as pin 109 is urged rightwardly so as to accommodate for the clearance between head 207 of the aisle support and the back seat 105.

FIG. 8 is a cross-sectional view 800 taken along the lines 8-8 of FIG. 7 illustrating the hexagonally shaped pin in cross section. Hexagonally shaped pins and apertures are used as it has been found practical to mold hexagonally shaped apertures. As the number of the sides of the apertures increase the moldability of the polymeric material increases. FIG. 8A is a cross-sectional view 800A taken along the lines 8A-8A of FIG. 7 illustrating pin 109 in aperture 208 and set screw 701 securing pin 109 in place.

FIG. 9 is an assembly view 900 of the aisle side energy absorber illustrating the hexagonally shaped pin 109, the aperture 401 in the seat back 105, the aperture 208 in the aisle support 101, and the threaded set screw 701 in the aisle support.

FIG. 9A is an assembly view 900A of the aisle side energy absorber illustrating a hollow hexagonally shaped pin or torsional member 777, threaded rod 772, and the cavity 291 in the aisle support leg 101. Hexagonally shaped torsional member 777, if slightly oversized, will have to be forcefully urged into hexagonal cavity 291 and hexagonal aperture 491C.

Figure 10:
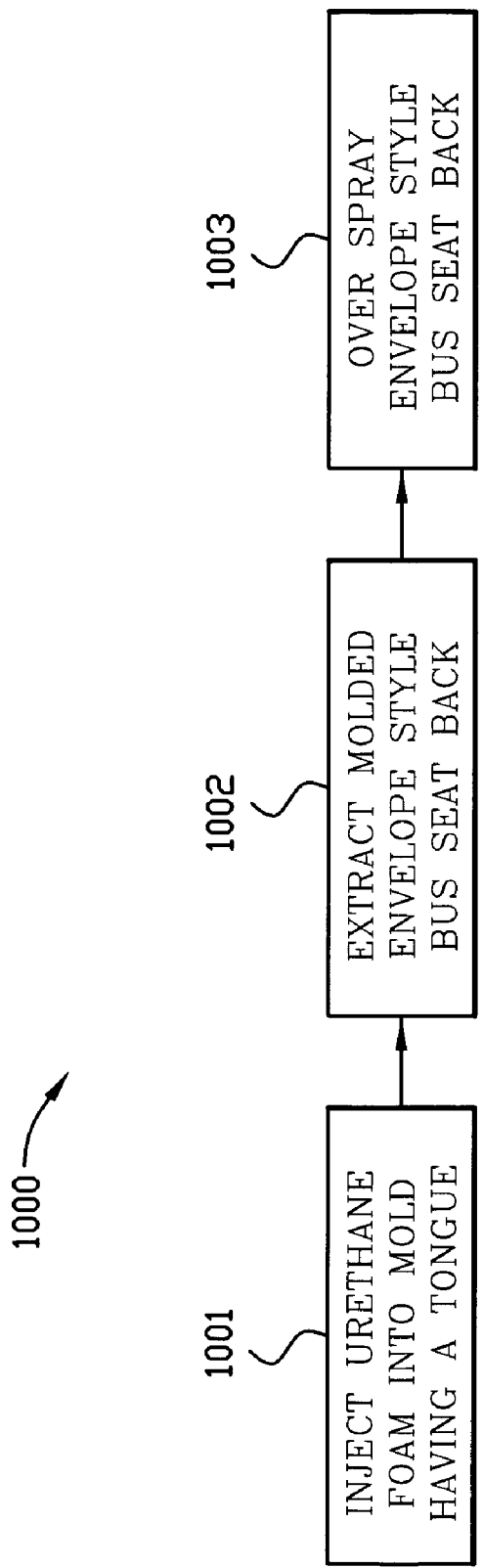
FIG. 10 is a schematic diagram illustrating the steps for producing an envelope style bus seat.

FIG. 10 is a schematic diagram 1000 illustrating the steps for producing an envelope style bus seat. First, the proper mold having a core must be utilized in order for the envelope to be created. If desired, Velcro may be molded directly into the foam which is injected 1001 into the mold having a core. After the foam has been formed into an envelope shape, it is extracted 1002 from the mold. Next, the extracted foam is over sprayed with an elastomeric spray to remove the imperfections from the foam. In this way a seat is formed having a smooth contour without holes in its surface. Holes are sometimes caused in making foam parts by the off gassing of the urethane.

Although thermoplastics are preferred for the supports, seat back and seat, thermoset materials may be used as well. Aluminum is preferred for the pins or fasteners but other metals or even polymeric materials may be used. The seat pivots or hinges are preferably metal studs and bolts but may be made from polymeric material. Similarly, the seat back is illustrated and described herein as a solid polymeric but other configurations are contemplated by the invention.

Additionally, the polymeric materials used in the invention may be made from fire retardant materials and/or from polymeric materials which will not burn. Some of the structural components used in the invention may be made from light weight metal alloys.

Figures 11, 11A:
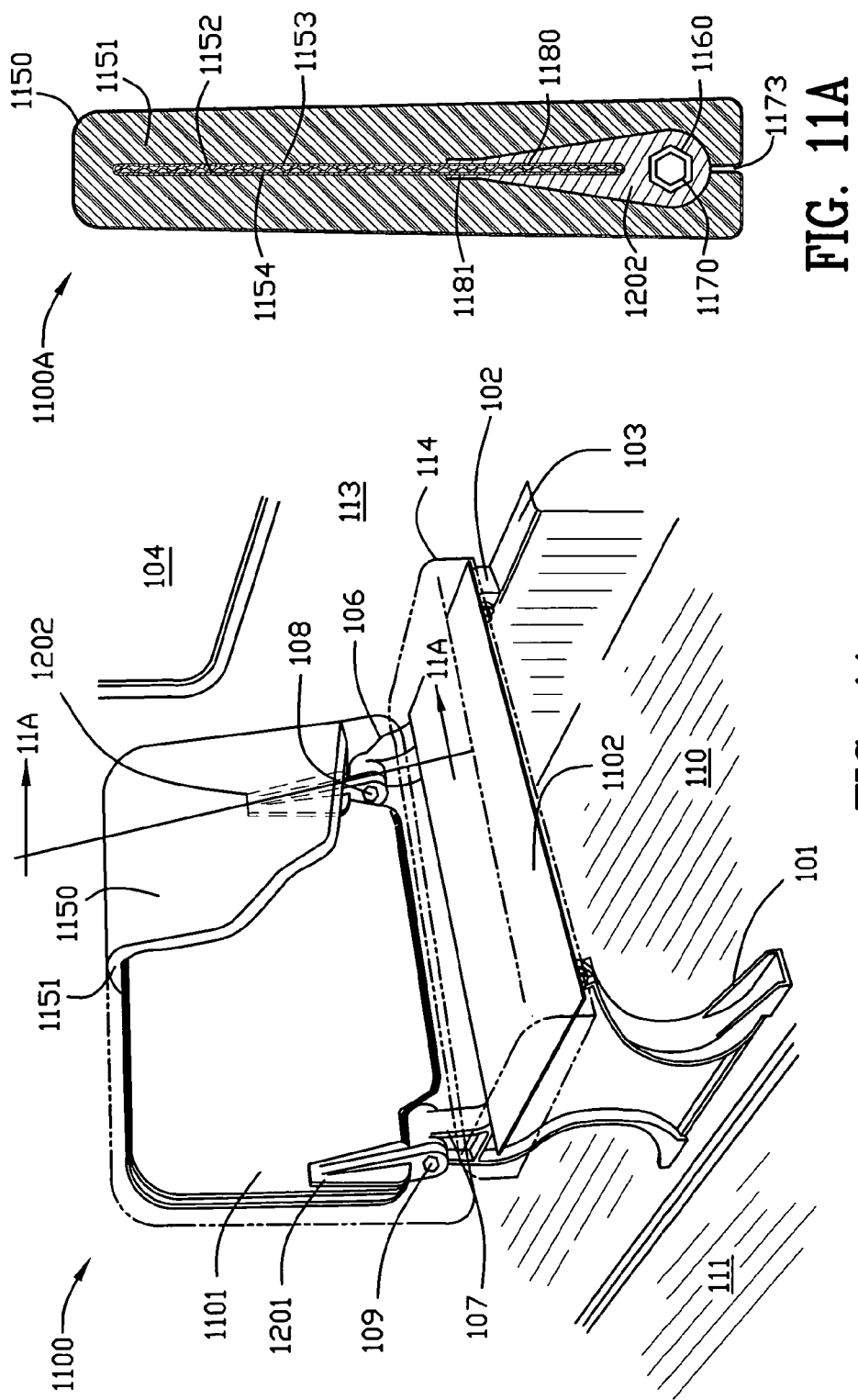
FIG. 11 is a front perspective view of a bus seat employing a sandwich composite with an integrally molded skin applied to the cushion of the seat back and the seat bottom.
FIG. 11A is a cross-sectional view taken along the lines 11A-11A illustrating a hexagonal pin, the seat back cushion and the seat back bracket.

FIG. 11 is a front perspective view 1100 of a bus seat employing a sandwich composite as a seat back 1101 and seat bottom 1102 with an integrally molded skin 1150 integrally affixed to the urethane cushion 1151. The urethane cushion is affixed to the seat back 1101 and the seat bottom 1102. FIG. 11A is a cross-sectional view 1 100A taken along the lines 11A-11A illustrating a hexagonal pin 1170 residing in a hexagonal aperture 1160. Seat back bracket 1202 is illustrated in cross section in FIG. 11A. Corrugated core 1152 separates rigid polyurethane plates 1153 and 1154 and is attached thereto. Reference numeral 1173 represents a discontinuity in the cushion so as to enable assembly of the back seat brackets 1201, 1202 to the aisle supports 107, 106, respectively. A slot 1216, best viewed in FIGS. 12 and 12A receives the composite seat back superstructure. Alternatively, slot 1216 may receive a solid reinforced polymer substrate with the cushion affixed thereto. Any of the cushions may be oversprayed with elastomer to ensure homogeneous surface finishes. Reference numerals 1180 and 1181 illustrated in FIG. 11A signify the adhesive attachment of the composite seat back superstructure.

Figure 11E:
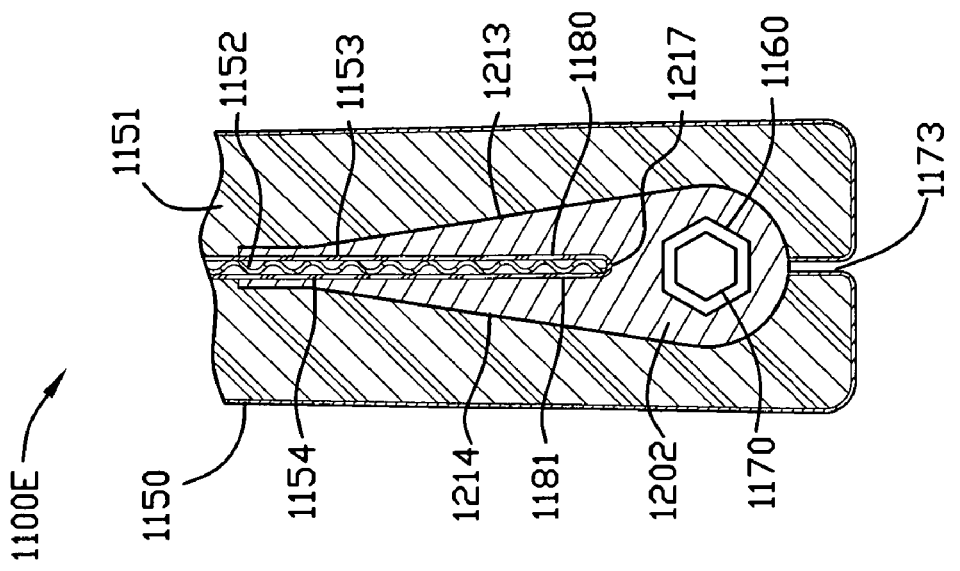
FIG. 11E is an enlargement of the bottom portion of FIG. 11A.
Figure 11D:
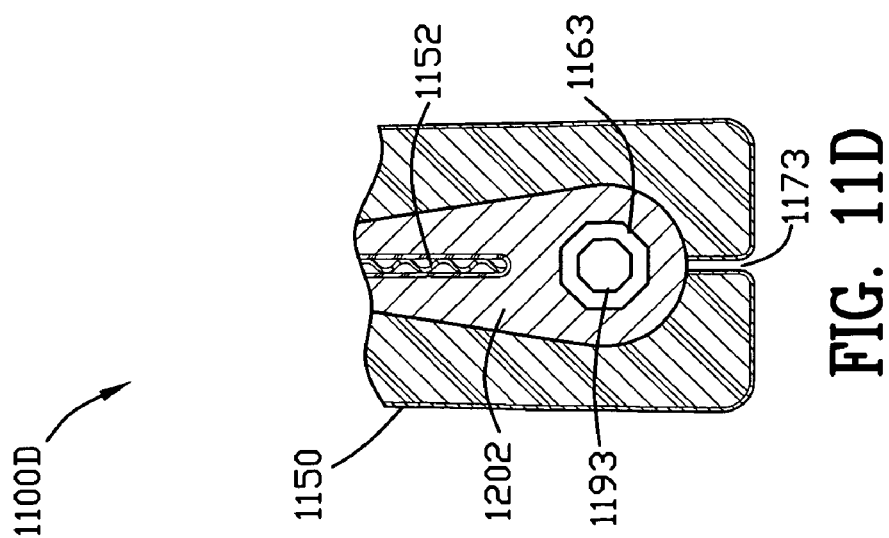
FIG. 11D is a cross-sectional view illustrating a octagaonal pin.

FIG. 11B is a cross-sectional view 100B illustrating a pentagonal pin 1191 residing in a respective pentagonal aperture 1161 of a back bracket support. FIG. 11C is a cross-sectional view 1100C illustrating a heptagonal pin 1192 residing in a respective pentagonal aperture 1162 of a seat back bracket support. FIG. 11D is a cross-sectional view 1100D illustrating an octagonal pin 1193 residing in a respective pentagonal aperture 1163 of a seat back bracket support. FIG. 11E is an enlargement 1100E of the bottom portion of FIG. 11A illustrating in better detail the composite seat back (1152, 1153 and 1154) residing in the slot 1216 of the seat back bracket. Pins 1191, 1192, and 1193 are preferably hollow but may be solid. Pins 1191, 1192 and 1193 are preferably made of Aluminum but also can be made of an inelastically deformable plastic.

FIG. 12 is a perspective view 1200 of one of the brackets 1202 illustrated in FIG. 11. Each bracket has a front side panel denoted by reference numerals 1211A, 1211B which is generally planar and a rear side panel denoted by reference numerals 1212A, 1212B which is also generally planar. These front and rear panels form slot 1216 and are supported by tapered ridges 1213, 1214 which terminate in a flat outer surface located at the top of bracket 1202 and denoted by reference numeral 1210. Slot 1216 includes a bottom 1217 upon which a substrate rests when assembled as illustrated in FIG. 11. Bracket 1202 includes a bottom portion 1215 as best illustrated in FIG. 12A. An aperture 1160 resides in the bottom portion and it is this aperture which interconnects a hexagonal pin (not shown in FIGS. 12-12B). A pentagonal, heptagonal or octagonal aperture may be used as well as set forth in FIGS. 11B-11D. Preferably, the brackets 1201, 1202 are made from fiber reinforced polymers.

FIG. 12A is a side view 1200A of one of the brackets illustrated in FIG. 11. A threaded bolt 1250 having a head 1251 and a nut 1252 is illustrated in FIG. 12A as an alternate attachment of the composite sandwich or the solid substrate to the bracket. It should be noted that if a solid substrate is used then the bracket may, alternatively, be deleted and the seat back structure can be constructed as set forth in FIG. 1 above. FIG. 12B is a front view 1200B of one of the brackets illustrated in FIG. 11 wherein the bottom 1219 thereof is indicated.

Figure 13:
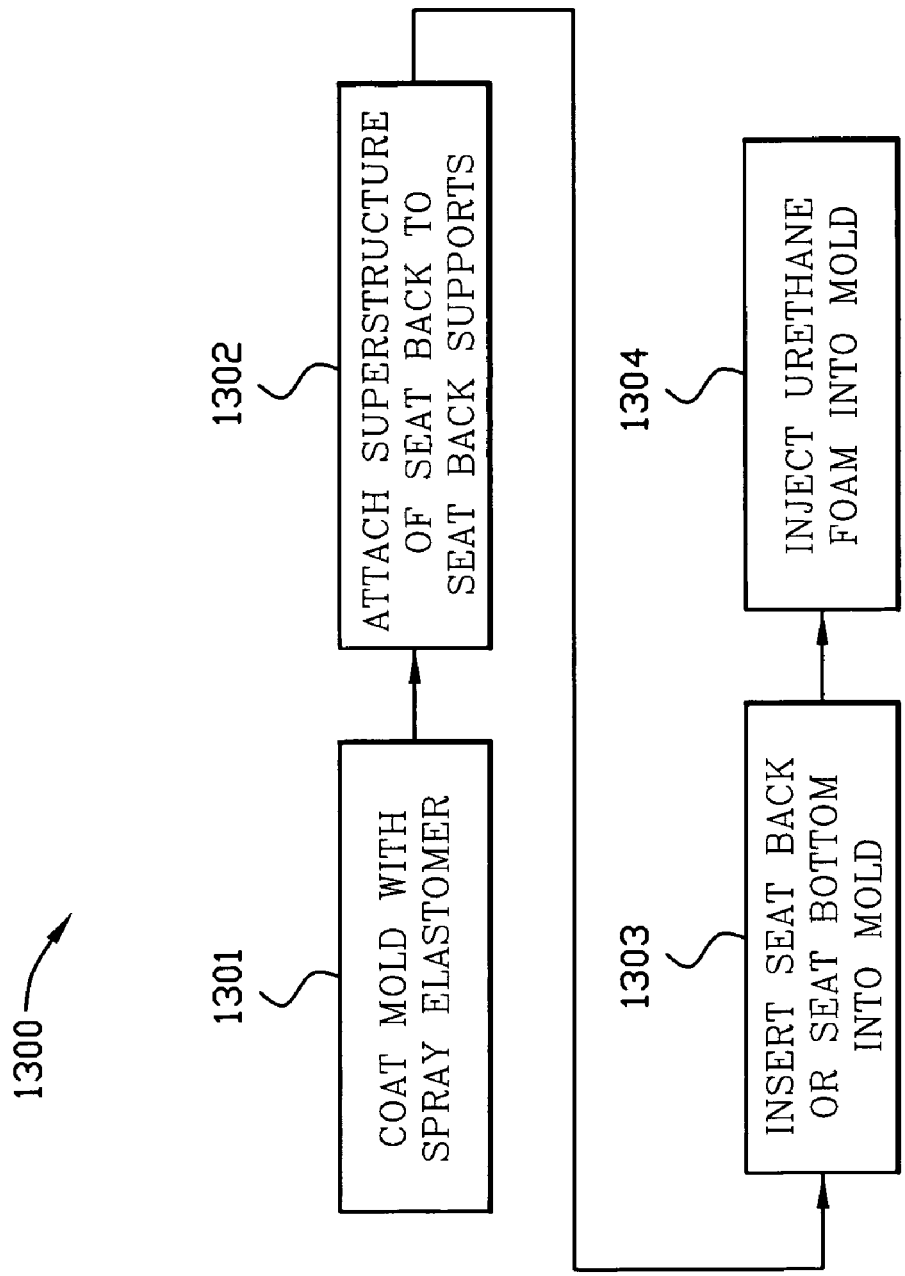
FIG. 13 is a diagram of the process steps of forming an elastomeric skinned foam over a seat back.

FIG. 13 is a diagram 1300 of the process steps of forming an elastomeric skinned foam over a seat back or a seat bottom. The elastomeric skinned foam may be formed over a composite sandwich having two rigid substrates separated by a core or it may be formed over a solid fiber-reinforced substrate. First, the interior of the mold is coated 1301 with a spray elastomer. Next, the superstructure of the seat back is attached 1302 to the seat back brackets and inserted 1303 into the mold. The mold can be designed so as to accommodate voids therein to permit formation of the elastomeric skinned cushion over just the back brackets. The voids will accommodate the areas where the back brackets attach directly to the aisle or window supports. Some voids are necessary so that the brackets 1201, 1202 may be attached using the pins to the aisle 101 and window 103 supports. Urethane foam is then injected 1304 into the mold forming an elastomeric skinned 1150 cushion 1151 integrally attached to the substrate 1154, 1152. The completed component is then removed from the mold and assembled as part of a bus seat.

Figure 14:
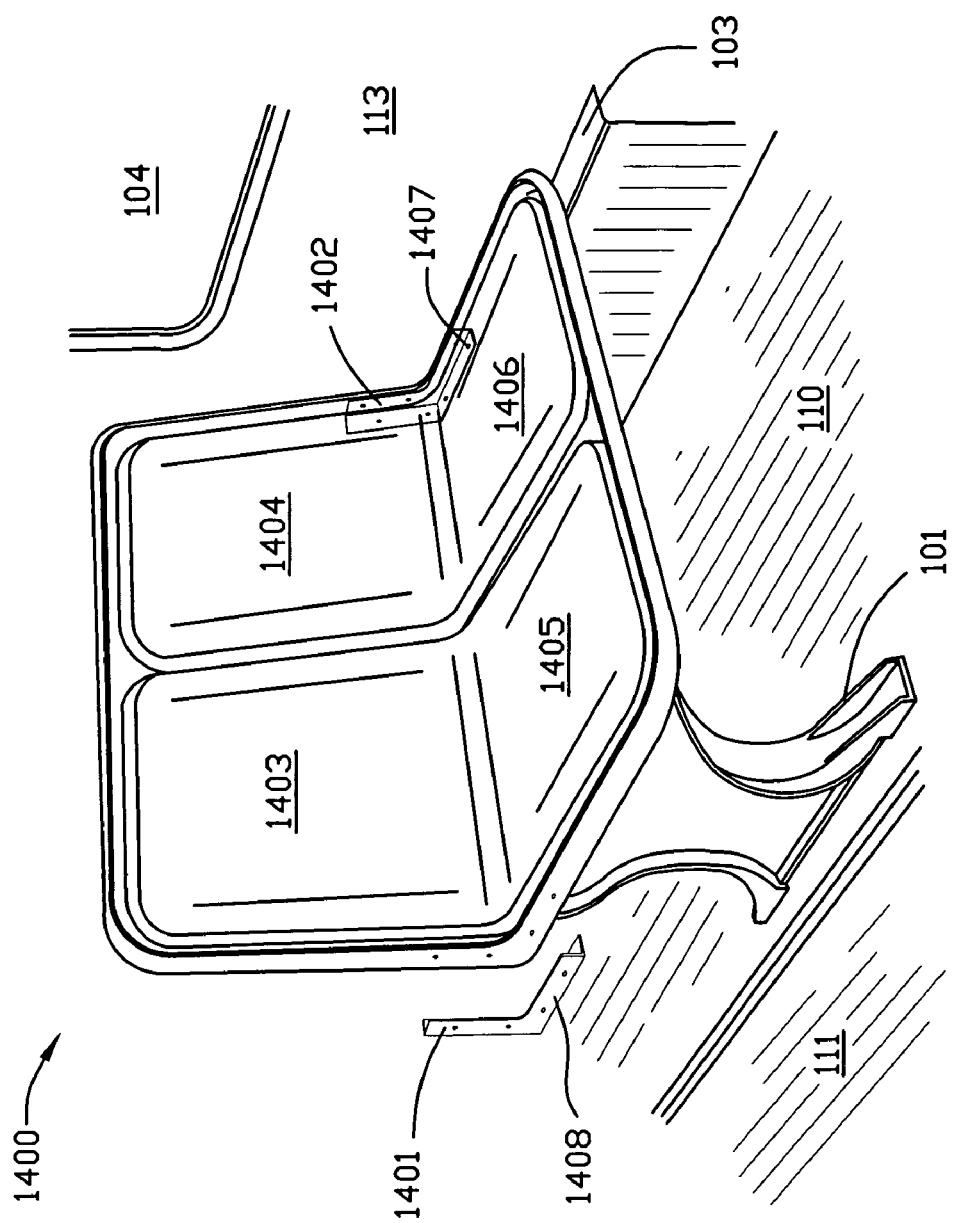
FIG. 14 is a perspective view of a one-piece plastic seat mounted directly onto the aisle support and the window support.

FIG. 14 is a perspective view 1400 of a one-piece plastic seat mounted 1408/1407 directly onto the aisle support 101 and the window support 103. Brackets 1401, 1402 engage the seats and the aisle and window supports. Two seats are provided 1403, 1405 and 1404, 1406. Upper portions 1403 and 1404 of the seats engage bracket portions 1401, 1402. When the upper portions 1403, 1404 of the seats sustain a sufficient impact load from behind, brackets 1401, 1402 inelastically deform and absorb the energy of the impact. Deformable energy absorbing brackets 1401, 1402 are threaded directly into the seats 1405, 1406 and the supports 101, 103. The seats (1405, 1406) and seat backs (1403, 1404) are preferably made of fiber reinforced polymer.

Figure 15:
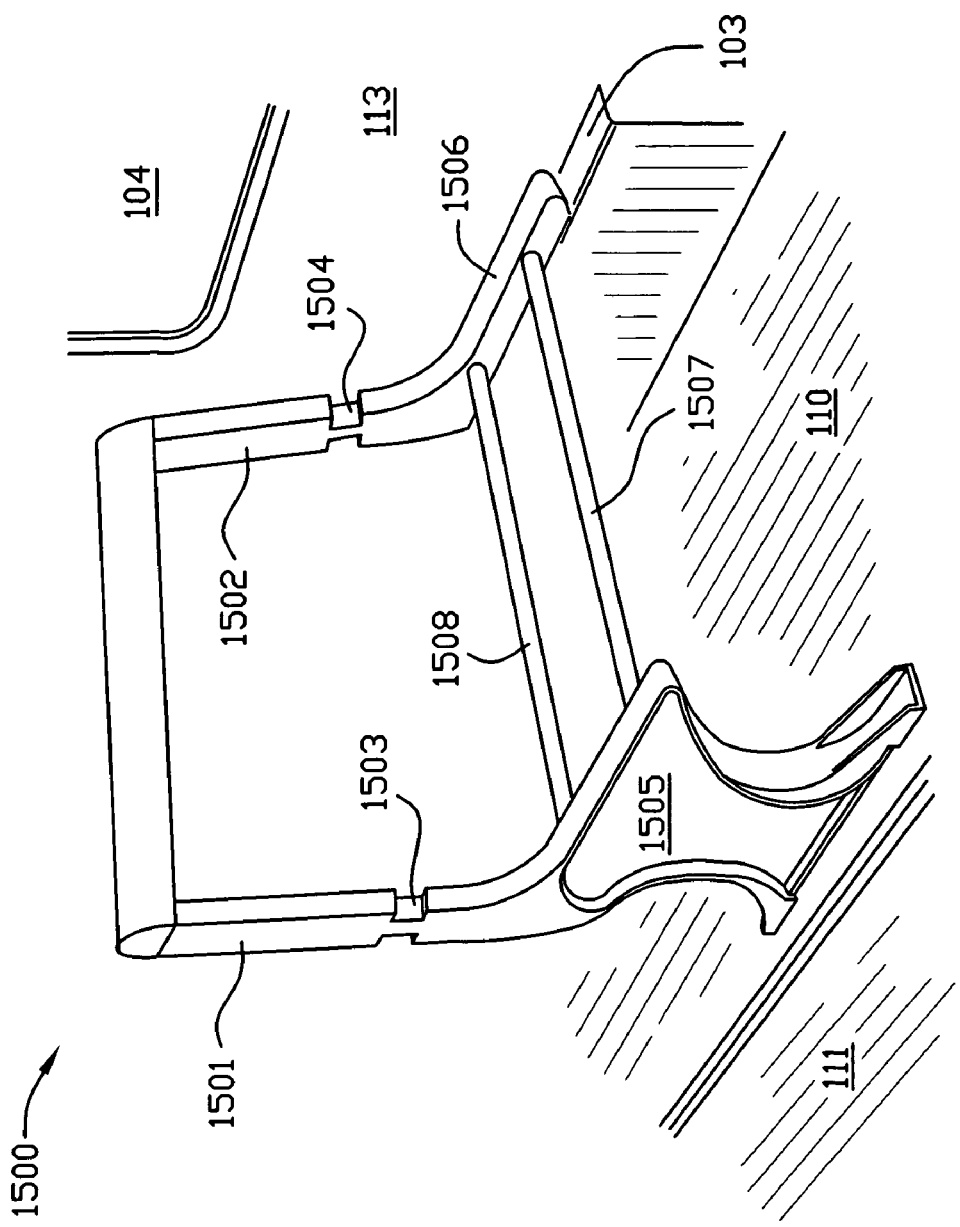
FIG. 15 is a perspective view of a seat frame employing fuses in the rear frame portion thereof for deforming upon impact of the seat back.

FIG. 15 is a perspective view 1500 of a seat frame (1501, 1502, 1505, 1506, 1507, 1508) employing fuses 1503, 1504 in the rear frame portion (1501, 1502) thereof for deforming upon impact of the seat back. Vertical left 1501 and right 1502 side supports for supporting a seat back are deformable upon the application of force to the superstructure. Fuses 1503, 1504 include notches in the front and rear thereof which create weak areas due to reduced cross-sectional area. The seat superstructure as shown in FIG. 15 is preferably made of fiber reinforced polymer.

Figure 16:
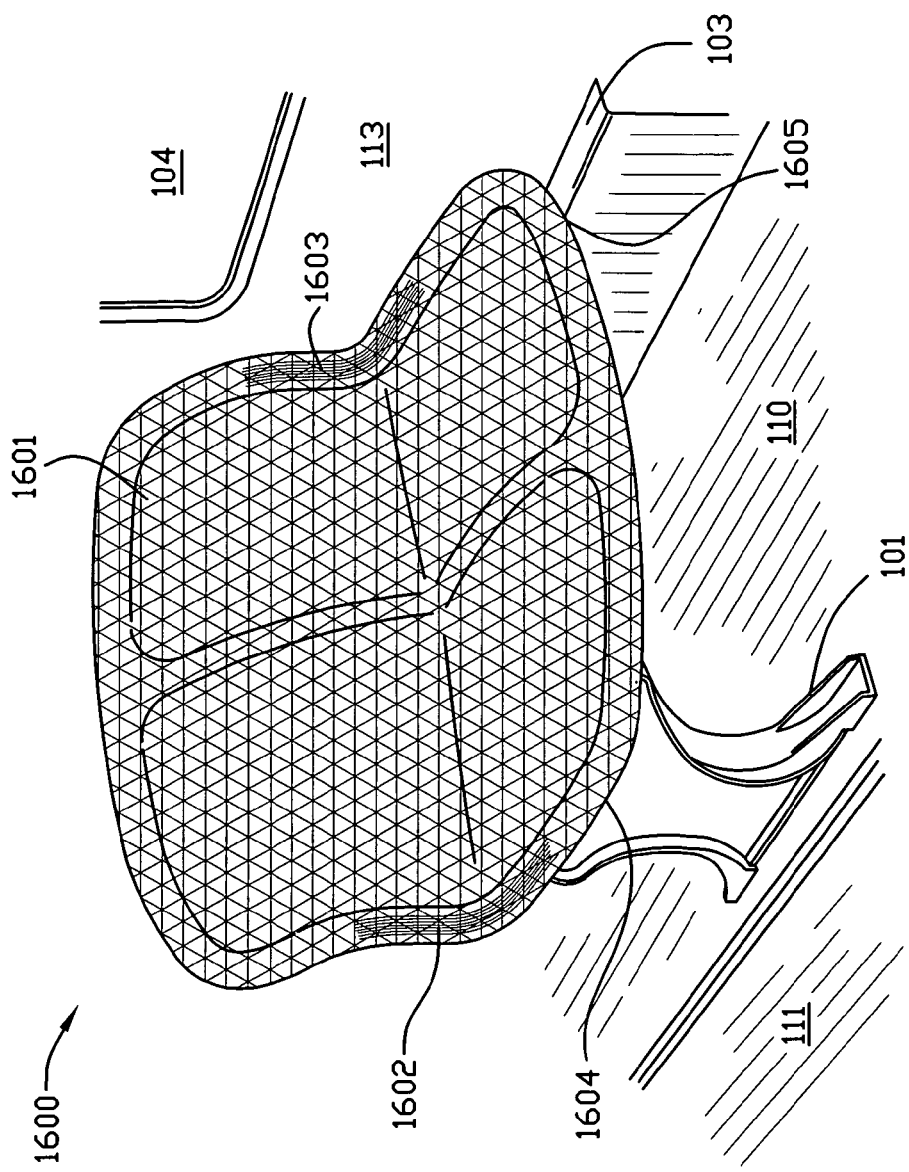
FIG. 16 is a perspective view of seat manufactured from isotropic glass with two directionalized glass mats embedded therein to absorb energy applied to the seat back.

FIG. 16 is a perspective view 1600 of a seat manufactured from isotropic glass 1601 with two directionalized glass mats 1602, 1603 embedded therein to absorb energy applied to the seat back. Directionalized glass mats 1602 and 1603 are 0.145 inches thick. The one-piece school bus seat include seat portions 1604, 1605 secured to the aisle 101 and window 103 supports and seat back portions. Upon sufficient impact from behind, directionalized glass mats 1602, 1603 inelastically deform.

While the invention has been described herein by way of Example only, those skilled in the art will readily recognize that changes may be made to the invention without departing from the scope of the appended claims.

The invention claimed is:

1. A school bus seat, comprising: a seat back, support legs, a seat bottom and a one-piece integral envelope cushion completely residing over said seat back, said envelope cushion includes an integrally molded polyurethane foam having an elastomeric skin formed on the exterior thereof; said seat back is a sandwich composite, and includes an aisle-side bracket interconnecting one of said support legs and a window-side bracket interconnecting the other of said support legs by pins selected from the group consisting of hollow pentagonal, hexagonal, heptagonal and octagonal pins; wherein said sandwich composite seat back is adhesively secured to said brackets.

2. A school bus seat as claimed in claim 1 wherein a component of said school bus seat back is made by the following steps:
coating a mold with a spray elastomer;
inserting said component into said mold; and,
injecting urethane foam into said mold, said urethane adhering to said component and said elastomer.

3. A school bus seat as claimed in claim 1 wherein said seat back includes a superstructure; said seat back is made by the following steps:
coating a mold with a spray elastomer;
attaching the superstructure of said seat back to the seat back brackets;
inserting the seat back into the mold; and,
injecting urethane foam into the mold, said urethane adhering to said superstructure of said seat back, said elastomer, and said brackets.

4. A school bus seat, comprising: a seat back, support legs, a seat bottom and a one-piece integral envelope cushion completely residing over said seat back, said envelope cushion includes an integrally molded polyurethane foam having an elastomeric skin formed on the exterior thereof; said seat back is a sandwich composite, and includes an aisle-side bracket interconnecting one of said support legs and a window-side bracket interconnecting the other of said support legs by pins selected from the group consisting of hollow pentagonal, hexagonal, heptagonal and octagonal pins; wherein said sandwich composite seat back is ultrasonically welded to said brackets.

5. A school bus seat, comprising: pins, said pins having a cross-sectional shape selected from the group consisting of a pentagon, a hexagon, a heptagon and an octagon; first and second brackets each including an aperture selected correspondingly from the group consisting of a pentagon, a hexagon, a heptagon and an octagon; first and second supports including an aperture selected correspondingly from the group consisting of a pentagon, a hexagon, a heptagon and an octagon; said apertures in said brackets and said supports being formed in a fiber reinforced polymer, said apertures being devoid of knit lines; and, said pins reside in said apertures of said supports and said apertures of said brackets inhibiting rotation of said brackets with respect to said supports.

6. A school bus seat as claimed in claim 5 wherein a component of said school bus seat back is made by the following steps:
coating a mold with a spray elastomer;
inserting said component into said mold; and,
injecting urethane foam into said mold, said urethane adhering to said component and said elastomer.

7. A school bus seat as claimed in claim 5 wherein said seat back includes a superstructure; said seat back is made by the following steps:
coating a mold with a spray elastomer;
attaching the superstructure of said seat back to the brackets;
inserting the seat back into the mold; and,
injecting urethane foam into the mold, said urethane adhering to said superstructure of said seat back, said elastomer, and said brackets.

8. A school bus seat as claimed in claim 5 further comprising a seat back secured to said brackets.

9. A school bus seat as claimed in claim 8 wherein said seat back is adhesively secured to said brackets.

10. A school bus seat as claimed in claim 8 wherein said seat back is ultrasonically welded to said brackets.

11. A school bus seat as claimed in claim 8 wherein said seat back is bolted to said brackets.

12. A school bus seat as claimed in claim 8 further comprising an elastomeric skinned cushion integrally molded to said seat back and said brackets.

13. A school bus seat as claimed in claim 8 wherein said seat back is a solid reinforced polymer.

14. A school bus seat as claimed in claim 13 further comprising an elastomeric skinned cushion integrally molded to said solid reinforced polymer seat back and said brackets.

15. A school bus seat as claimed in claim 8 wherein said seat back is a sandwich composite.

16. A school bus seat as claimed in claim 15 further comprising an elastomeric skinned cushion integrally molded to said sandwich composite seat back and said brackets.

17. A school bus seat, comprising: a seat back, support legs, a seat bottom and a one-piece integral envelope cushion completely residing over said seat back, said envelope cushion includes an integrally molded polyurethane foam having an elastomeric skin formed on the exterior thereof; said seat back is a sandwich composite, and includes an aisle-side bracket interconnecting one of said support legs and a window-side bracket interconnecting the other of said support legs by pins selected from the group consisting of hollow pentagonal, hexagonal, heptagonal and octagonal pins; and said brackets are formed of a fiber reinforced polymer.

18. A school bus seat as claimed in claim 17 wherein said support legs are formed of a fiber reinforced polymer.

19. A school bus seat as claimed in claim 17 wherein said seat back includes a superstructure; said seat back is made by the following steps:
   coating a mold with a spray elastomer;
   attaching seat superstructure of said seat back to the seat back brackets;
   inserting the seat back into said mold; and,
   injecting urethane foam into said mold, said urethane adhering to said superstructure of said seat back, said elastomer, and said brackets.

20. A school bus seat as claimed in claim 17 wherein a component of said school bus seat back is made by the following steps:
   coating a mold with a spray elastomer;
   inserting said component into said mold; and,
   injecting urethane foam into said mold, said urethane adhering to said component and said elastomer.

* * * * *